(12) United States Patent
Renson

(10) Patent No.: US 12,542,395 B2
(45) Date of Patent: Feb. 3, 2026

(54) FLUSH-MOUNTED BOX WITH REDUCED DIMENSIONS AND KIT AND METHOD FOR INSTALLING AN ELECTRICAL BASIC ELEMENT IN A HOLLOW WALL

(71) Applicant: Shiver nv, Veurne (BE)

(72) Inventor: Thibault Renson, Veurne (BE)

(73) Assignee: Shiver nv, Veurne (BE)

( * ) Notice: Subject to any disclaimer, the term of this patent is extended or adjusted under 35 U.S.C. 154(b) by 272 days.

(21) Appl. No.: 18/510,124

(22) Filed: Nov. 15, 2023

(65) Prior Publication Data

US 2024/0195108 A1    Jun. 13, 2024

(30) Foreign Application Priority Data

Nov. 15, 2022   (BE) .................................. 2022/5920
Jul. 31, 2023   (BE) .................................. 2023/5635

(51) Int. Cl.
*H01R 13/00*   (2006.01)
*H01R 13/422*  (2006.01)
*H01R 13/50*   (2006.01)
*H01R 13/73*   (2006.01)
*H01R 24/76*   (2011.01)

(52) U.S. Cl.
CPC ........... *H01R 13/50* (2013.01); *H01R 13/422* (2013.01); *H01R 13/73* (2013.01); *H01R 24/76* (2013.01)

(58) Field of Classification Search
CPC .......... H02G 3/081; H02G 3/121; H02G 3/10; H02G 3/12; H02G 3/14; H02G 3/20; H02G 3/22
See application file for complete search history.

(56) References Cited

U.S. PATENT DOCUMENTS

| | | | |
|---|---|---|---|
| 2,063,923 A | 12/1936 | Gries | |
| 9,735,558 B1 * | 8/2017 | Gretz | ................. H01R 13/5202 |
| 9,854,691 B2 * | 12/2017 | Caille | ...................... H02G 3/18 |
| 11,088,523 B1 * | 8/2021 | Gretz | ..................... H02G 3/088 |

FOREIGN PATENT DOCUMENTS

| | | |
|---|---|---|
| DE | 10 2018 104818 B3 | 5/2019 |
| DE | 10 2018 104820 B3 | 5/2019 |
| FR | 2 780 597 A1 | 12/1999 |
| WO | 2019/143993 A1 | 7/2019 |
| WO | 2020/120545 A1 | 6/2020 |

OTHER PUBLICATIONS

Search report from priority application BE2022/5920, not translated but presents X/Y/A.

* cited by examiner

*Primary Examiner* — Pete T Lee
(74) *Attorney, Agent, or Firm* — Vorys, Sater, Seymour and Pease LLP

(57) ABSTRACT

The present invention relates to a flush-mounted box for installation in a hollow wall, comprising: a hollow body with an open base surface and a side wall, a flange, at least one clamp for clamping the flush-mounted box and a clamp screw through the clamp, wherein the hollow body can be placed in a cylindrical space up to the flange, wherein the cylindrical space has an inner diameter of 37 mm±4 mm, wherein the clamp screw of the at least one clamp is placed on a circular outline with a diameter of no more than 28.5 mm and wherein the circular outline and the cylindrical space are concentric. The invention also relates to an assembly of the flush-mounted box and an electrical base element and a method for installing an electrical base element in a hollow wall.

19 Claims, 15 Drawing Sheets

FLUSH-MOUNTED BOX WITH REDUCED DIMENSIONS AND KIT AND METHOD FOR INSTALLING AN ELECTRICAL BASIC ELEMENT IN A HOLLOW WALL

TECHNICAL FIELD

The invention relates to a flush-mounted box for installation of an electrical base element in a hollow wall, more in particular a flush-mounted box with reduced dimensions with respect to the electrical base element. The invention also relates to a kit and a method for installing an electrical base element in a hollow wall.

PRIOR ART

Flush-mounted boxes for switchgear and electrical outlets are ubiquitous in a modern home or any other building. Typically, one or more interchangeable sockets or switches are mounted in the flush-mounted boxes, to which electrical wiring runs from the surrounding wall structure. In some cases, other electrical base elements, such as sensors, lights and other components, are mounted in the flush-mounted boxes.

As is known, flush-mounted boxes usually have the shape of a beam or a cylinder, the front of which is open. A specific embodiment concerns flush-mounted boxes for installation of an electrical base element in a hollow wall. The flush-mounted box is hooked behind the hollow wall, such as a plaster wall, using clamps, with the open side of the flush-mounted box facing a room. Electrical cabling is led to the flush-mounted box and attached to the electrical base element. The electrical outlet, switchgear or other electrical base element is then installed inside the flush-mounted box. The open front of the flush-mounted box is then covered by a cover frame with one or more openings through which the active part of the electrical outlet, the switchgear or the other electrical base element protrudes.

Such flush-mounted boxes for hollow walls are known from, among others, ES188370U (ES '370) and U.S. Pat. No. 9,627,870 (US '870). The flush-mounted boxes from ES '370 and US '870 comprise a hollow body with an open front and a side wall with a flange around the open front. Flush-mounted boxes for hollow walls have two opposing slots in the side wall in which a movable clamp is mounted and clamp screws through the clamps. By tightening the clamp screws, the clamps are moved in the slots towards the open front until the flange is clamped against the front and the clamps against the rear of the hollow wall. The flush-mounted box is secured in the hollow wall in this way.

These well-known flush-mounted boxes have the disadvantage that the clamps must be able to be moved very close to the open front, so that the flush-mounted boxes can also be secured in thin hollow walls, such as plasterboard with a thickness of 9 mm. This means that the clamp screws must extend almost to the open front. The active part of the socket, switchgear or other electrical base element also extends to the open front. The clamp screws necessarily extend next to the functional part of the electrical base element. This makes the flush-mounted box larger than strictly necessary to accommodate the electrical base element, which also requires a larger cover frame to cover the open front of the flush-mounted box.

This type of installation has been used for so many years that, from an aesthetic point of view, most people simply accept the presence of a large cover frame as a necessary evil. Of course, numerous attempts have been made to improve the appearance of cover frames, but with very mixed results. At best, the cover frame has turned into a more or less decorative item, while at worst, the cover frame is an even more obvious eyesore.

U.S. Pat. No. 8,232,482 (US 482) describes a method for installing a socket. This method uses a flush-mounted box with a plaster plate. After installing the flush-mounted box, plaster is applied to the plaster plate, so that the plasterwork almost reaches the socket. This means there is no need for a cover frame. The disadvantage of this method is that installing the flush-mounted box is labor intensive. Plastering also requires a certain skill from an installer.

There is therefore a need for an easy-to-install flush-mounted box with reduced dimensions to minimize the visual impact of cover frames as much as possible or even make the use of cover frames unnecessary.

The present invention aims to solve at least some of the above problems or drawbacks.

SUMMARY OF THE INVENTION

In a first aspect, the present invention relates to a flush-mounted box according to claim 1.

This flush-mounted box is very advantageous because it has such minimal dimensions that they are almost equal to a functional part of an electrical base element. As a result, after placement of the flush-mounted box in a hollow wall and the electrical base element in the flush-mounted box, there is only a very narrow gap between the hollow wall and the functional part of the electrical base element. This means that a cover frame only needs to be very limited, for example to cover the flange of the flush-mounted box, or it is even completely unnecessary to use a cover frame, for example if the flange can remain visible, for example, by mounting the flange recessed into a recess milled in the wall. The flush-mounted box has minimal dimensions because the at least one clamp is placed on a circular outline with a diameter of no more than 28.5 mm. Thanks to the at least one clamp, the flush-mounted box can easily be clamped into an opening in the hollow wall and it is not necessary to plaster after installing the flush-mounted box. An installer does not need to have any skills in plastering.

Preferred forms of the flush-mounted box are shown in claims 2-7.

A specific preferred form concerns a flush-mounted box according to claim 4.

The click system is advantageous because it allows a smaller electrical base element to be used, which allows the dimensions of the flush-mounted box and/or the dimensions of the cover frame to be reduced. Usually an electrical base element comprises clamps that can be moved outwards and clamp against the side wall of the flush-mounted box. The flush-mounted box must provide sufficient space around the electrical base element so that the clamps can be moved outward. Alternatively, an electrical base element usually comprises a mounting frame that is placed on the flush-mounted box outside the flush-mounted box and screwed to the flush-mounted box. This mounting frame must also be hidden by the cover frame. In this embodiment, the clamps and mounting frame for an electrical base element are unnecessary, so that the flush-mounted box can fit more closely around the electrical base element and the cover frame can be made smaller or can be omitted because no mounting frame has to be hidden.

In a second aspect, the present invention concerns an assembly according to claim 8.

This assembly has the advantage that there is only a very narrow gap between the hollow wall and the functional part of the electrical base element. This means that a cover frame only needs to be very limited, for example to cover the flange of the flush-mounted box, or it is even completely unnecessary to use a cover frame, for example if the flange can remain visible.

In a third aspect, the present invention relates to a method according to claim 12.

This method has the advantage, among other things, that an electrical base element can be placed in the hollow wall in a manner familiar and simple to a person skilled in the art. A person skilled in the art does not need to take any additional actions or steps. By using a flush-mounted box according to the first aspect, the flush-mounted box fits more closely around the electrical base element, so that a smaller cover frame can be used to hide the flush-mounted box or even no cover frame needs to be used, as a result of which the visual impact of the cover frame is limited or even non-existent compared to conventional cover frames. An installer does not need to have any skills in plastering to carry out the method. Preferred embodiments of the method are described in the dependent claims 13-17.

DETAILED DESCRIPTION

Figure 1:
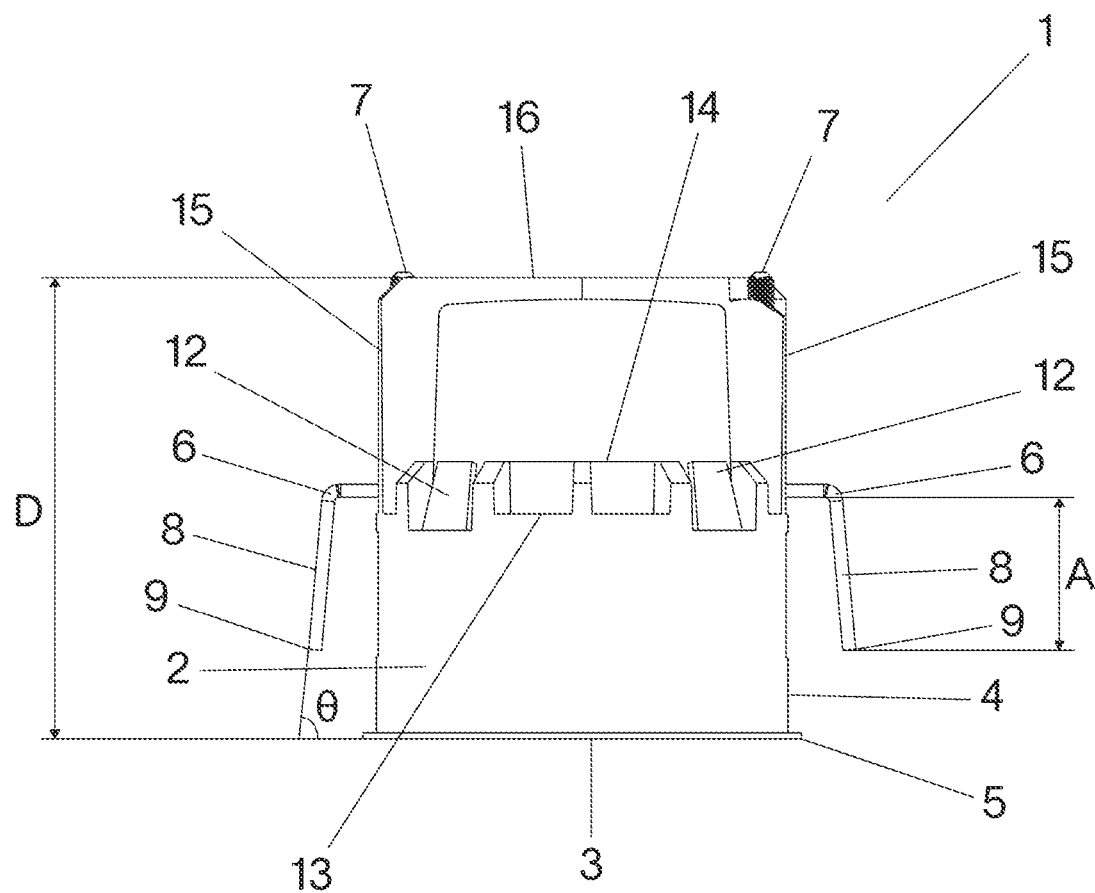
FIG. 1 shows a side view of a flush-mounted box according to an embodiment of the present invention.

Unless otherwise defined, all terms used in the description of the invention, including technical and scientific terms, have the meaning as commonly understood by a person skilled in the art to which the invention pertains. For a better understanding of the description of the invention, the following terms are explained explicitly.

In this document, "a" and "the" refer to both the singular and the plural, unless the context presupposes otherwise. For example, "a segment" means one or more segments.

The terms "comprise," "comprising," "consist of," "consisting of," "provided with," "include," "including," "contain," "containing," are synonyms and are inclusive or open terms that indicate the presence of what follows, and which do not exclude or prevent the presence of other components, characteristics, elements, members, steps, as known from or disclosed in the prior art.

Quoting numeric intervals by the endpoints includes all integers, fractions, and/or real numbers between the endpoints, including those endpoints.

In the context of this document, an electrical base element is an element that is placed in the flush-mounted box through an open base surface in a flush-mounted box, whereby a functional part of the electrical base element is accessible through the open base surface in the flush-mounted box. Non-limiting examples of electrical base elements are sockets, switchgear such as switches, push-buttons, sensors, orientation lighting, data connections, multimedia connections, etc. The electrical base element typically comprises provisions for removably attaching the electrical base element in the flush-mounted box, such as clamps, keyhole slots, notches or cams for interaction with flexible arms of a click system, etc.

In the context of this document, a central part is a cover plate for covering a central part of an electrical base element. The cover plate has both an aesthetic function and a safety function. After installation, the central part covers live parts of the electrical base element. A central part according to the prior art does not cover the facilities for removably attaching the electrical base element in the flush-mounted box. Non-exhaustive examples of a central part are a push part of a switch or push button, a cover plate of a socket, a lens of a sensor or orientation light, etc.

In the context of this document, a cover frame is a cover plate with at least one opening for a central part. After placement of the cover frame, the central part is located in at least one opening. The cover frame preferably connects around the central part in the at least one opening. The cover frame covers, after placement, a flush-mounted box and not yet covered facilities for the removable attachment of an electrical base element in the flush-mounted box of an electrical base element placed in the flush-mounted box.

In the context of this document, concentric means having a common center, for example a common center in the case of circles, a common center in the case of squares or rectangles, where outlines of for example circles, squares or rectangles do not touch or intersect each other, wherein a distance between an outline of a first concentric circle, square or rectangle and an outline of a second concentric circle, square or rectangle remains the same along the circumference of the first concentric circle, square or rectangle and where the mentioned distance is measured perpendicular to the outline of the first concentric circle, square or rectangle.

In the context of this document, a centerline is a line, imaginary or otherwise, that runs through the center of an object.

In a first aspect, the invention concerns a flush-mounted box for installation of an electrical base element in a hollow wall.

According to a preferred embodiment, the flush-mounted box comprises a hollow body, a flange, at least one clamp for clamping the flush-mounted box in the hollow wall and a clamp screw through the at least one clamp.

It will be apparent that if a flush-mounted box comprises more than one clamp, "the at least one clamp" describes a feature that applies to all clamps for clamping the flush-mounted box. Thus, if the flush-mounted box comprises two, three or more clamps, each of the two, three or more clamps comprises a clamp screw through the clamp.

The hollow body comprises an open base surface and a side wall. The open base surface is bounded by the side wall. The side wall is preferably substantially transverse to the open base surface. Substantially transverse means that the side wall is at an angle of at least 80°, preferably at least 82°, more preferably at least 84°, even more preferably at least 86° and even more preferably at least 88° and at most 90° to the open base surface. The hollow body is preferably a cylinder or a truncated cone. Alternatively, the hollow body is formed by two or more cylinders or two or more truncated cones, where axes of the two or more cylinders, respectively, of the two or more truncated cones, are parallel and where the two or more cylinders, respectively, the two or more truncated cones are connected by a beam-shaped body extending in a direction transverse to the axes mentioned, thereby preferably forming a single hollow body. This is advantageous for installing multiple electrical base elements in a single flush-mounted box in a hollow wall. The hollow body comprises a closed or an open top surface opposite the open base surface.

The flange is around the open base surface. The open base surface and the flange lie in the same plane. The flange extends in a direction parallel to the open base surface and away from the hollow body. This means that the open base surface is not fully or partially covered by the flange. The flange preferably has a width of at least 1.0 mm, more preferably at least 1.5 mm. The flange preferably has a width of at most 5.0 mm, more preferably at most 4.0 mm. The width is measured in the plane in which the open base surface and the flange lie and transversely to an edge of the open base surface.

The hollow body can be placed in a cylindrical space up to the flange. This is advantageous because it allows the flush-mounted box to be easily installed by drilling or cutting out a hole in the hollow wall or in a piece of furniture. The hole has a size that is smaller than the flange, so that the flush-mounted box cannot be pushed through the hole. It will be apparent that the cylindrical space is not necessarily a real space but can also be a virtual cylindrical space with a diameter equal to a diameter of the hole, which is available in a larger real space in a hollow wall or piece of furniture. Optionally, a recess is provided around the hole. The recess is suitable for receiving the flange.

The at least one clamp comprises an internally threaded opening. The clamp screw is screwed into the internally threaded opening. A screw head of the clamp screw rests against a support surface. The support surface is located in the flush-mounted box at a distance B from the open base surface. The screw head is an end of the clamp screw suitable for receiving a screwdriver for tightening the clamp screw. The distance B is measured from the open base surface and in a direction transverse to the open base surface. The at least one clamp can be moved by tightening the clamp screw along the side wall to a plane formed by the open base surface. A plane formed by the open base surface means a plane that extends infinitely, is parallel to the open base surface and where the open base surface lies in said plane. The flush-mounted box comprises for the at least one clamp a guide for guiding the at least one clamp, the guides extending in a direction transverse to the open base surface along the clamp screw. The guides are configured to prevent a rotational movement of a clamp about the clamp screw when the clamp is in the guide. The guides preferably have a U-shaped cross-section in a plane parallel to the open base surface. When the clamps are in the guides, the clamps cannot rotate around the clamp screws when tightening the clamp screws and screwing results in a translation of the clamps to the open base surface.

If the flush-mounted box fits closely against the hole in the hollow wall or in the piece of furniture after placement in the cylindrical space, one clamp is in principle sufficient to clamp the flush-mounted box in place. The flush-mounted box preferably comprises at least two clamps. This is advantageous for firmly clamping the flush-mounted box in the wall or in the piece of furniture, even if, for example, the flush-mounted box fits less closely against the hole in the wall or in the piece of furniture. The two clamps are preferably positioned opposite each other in the flush-mounted box. If the flush-mounted box comprises more than two clamps, the clamps may or may not be regularly distributed over a circular outline. Preferably, the clamps are distributed regularly over the circular outline.

According to a preferred embodiment, the cylindrical space in which the hollow body can be placed has an inner diameter of 37 mm±4 mm. Preferably, the cylindrical space has an inner diameter of 36.5 mm±3 mm. The clamp screw of the at least one clamp is placed on a circular outline with a diameter of at most 28.5 mm, preferably on a circular outline with a diameter of at most 28 mm, more preferably on a circular outline with a diameter of at most 27.5 mm, even more preferably on a circular outline with a diameter of not more than 27 mm and even more preferably on a circular outline with a diameter of not more than 26.5 mm. The circular outline and the cylindrical space are concentric.

This embodiment is particularly advantageous for a type B socket according to the IEC 60083:2015 standard. This is a socket with two contact points for an electrical voltage and a grounding contact point. A type B socket is used in the United States of America, among others.

An enveloping circle for the smallest possible insulation surface for the type B socket fits within a cylindrical space with an inner diameter of 36.5 mm±3 mm. Regulations prescribe a minimum insulation surface around the contact points for each type of socket. The enveloping outline of the smallest possible insulation surface around the contact points therefore corresponds to the smallest possible bore diameter for installing a socket in a wall or piece of furniture. If an even smaller hole is drilled, it will not be possible to install the socket in the wall or piece of furniture. In that case, the minimum insulation surface of the socket hits the wall or piece of furniture. In a cylindrical space with an inner diameter of 36.5 mm±3 mm there is sufficient space for a hollow body with a wall thickness of at least 0.8 mm, wherein the hollow body is a cylinder or a truncated cone, while the bore diameter for a hole in which the flush-mounted box is installed remains very limited.

Preferably, the cylindrical space has an inner diameter of at most 39 mm, more preferably at most 38 mm, even more preferably at most 37.5 mm and even more preferably at most 37 mm.

Preferably, the cylindrical space has an inner diameter of at least 34 mm, more preferably at least 35 mm, even more preferably at least 35.5 mm and even more preferably at least 36 mm.

According to an embodiment, the clamps comprise a protrusion. After placement of the flush-mounted box in the hollow wall, the protrusion extends outside the hollow body to the plane formed by the open base surface over a distance A. The distance A is measured in a direction transverse to the open base surface. The distance A is measured from a point closest to the open base surface where the clamp screw intersects the clamp to a free end of the clamp. The closest point where the clamp screw intersects the clamp is where the clamp screw is screwed into the internally threaded opening. A non-limiting example of a suitable shape for the clamps is an L-shape.

A screw head of the clamp screw rests against a support surface. The support surface is located in the flush-mounted box at a distance B from the open base surface. The screw head is an end of the clamp screw suitable for receiving a screwdriver for tightening the clamp screw. The distance B is measured from the open base surface and in a direction transverse to the open base surface. The distance A is at least 70% of the distance B.

When the clamps are moved to the open base surface, the free ends of the protrusions will first contact the hollow wall, thereby securing the flush-mounted box in the hollow wall by resting of the flange on a front side of the hollow wall, pressing of the free ends of the protrusions on an opposite back side of the hollow wall, and the abutment of the screw heads against the support surface. The protrusions make it possible to place the clamp screws deeper in the flush-mounted box. This means that the support surface for the screw heads of the clamp screws is located at a greater distance B from the open base surface than is usual with known flush-mounted boxes for hollow walls. Because the distance A is at least 70% of the distance B, the free ends of the protrusions will still touch the rear side of the hollow wall when the clamps are fully moved up to the screw heads with common thicknesses for hollow walls.

According to a further embodiment, the distance B is at least 15 mm. Preferably the distance B is at least 17 mm, more preferably 18 mm, even more preferably at least 19 mm and even more preferably at least 20 mm.

A distance B of at least 15 mm is advantageous because it allows the clamp screws, viewed from the open base surface, to be placed behind a central part or behind the central part and part of the electrical base element. This is even possible for a socket as an electrical base element. This results in a reduced surface area for the open base surface, which also results in a smaller cover frame or even no cover frame for concealing the flush-mounted box. The distance A in this embodiment is at least 10.5 mm. When using a clamp screw with a thread up to 3 mm from an end of the clamp screw on the screw head side, this means that the flush-mounted box can be installed in hollow walls with a thickness of approximately 15 mm–10.5 mm+3 mm or 7.5 mm. Hollow walls are usually formed using 9.5 or 12.5 mm plasterboard.

This embodiment is particularly advantageous for European sockets, in particular sockets of types E and F according to standard IEC 60083:2015.

According to an embodiment, the distance B is at least 1 mm. Preferably, the distance B is at least 2 mm, more preferably at least 3 mm, even more preferably at least 4 mm, even more preferably at least 5 mm, even more preferably at least 6 mm, even more preferably at least 7 mm, even more preferably at least 8 mm and most preferably at least 9 mm.

A distance B of at least 1 mm is advantageous if a central part is flush with the flange of the flush-mounted box, because this means that the clamp screws are sufficiently far away from the central part so that there can be no electrical contact between the central part and the clamp screws. This is particularly advantageous with a metal central part.

A distance B from at least 5 mm is advantageous because it allows the clamp screws, viewed from the open base surface, to be placed behind the central part or behind the central part and part of the electrical base element or behind the electrical base element. This results in a reduced surface area for the open base surface, which also results in a smaller cover frame or even no cover frame for concealing the flush-mounted box. This embodiment is particularly advantageous for type B sockets according to standard IEC 60083:2015, because in these sockets the central part can lie flush with the flange of the flush-mounted box, unlike most European sockets where the central part is recessed.

According to a preferred embodiment, the flush-mounted box comprises at least two clamps, wherein a distance between a first clamp screw and a nearest second clamp screw is at most 45 mm, preferably at most 42 mm, more preferably at most 39 mm, even more preferably at most 36 mm, even more preferably at most 33 mm and most preferably at most 30 mm. The distance is measured between a first centerline of the first clamp screw and a second centerline of the second clamp screw. The first centerline is oriented along a longitudinal direction of the first clamp screw. The second centerline is oriented along a longitudinal direction of the second clamp screw. Preferably, the first clamp screw and the second clamp screw are parallel. Preferably, the first clamp screw and the second clamp screw are positioned opposite each other in the flush-mounted box. This embodiment is particularly advantageous because the position of the clamp screws largely determines the overall dimensions of the hollow body. The closer the clamp screws are placed to each other, the smaller the overall dimensions can be made and the closer the flush-mounted box fits to the electrical base element, as a result of which the visual impact of the cover frame is greatly limited or there is even no cover frame present.

This embodiment is particularly advantageous for European sockets, in particular sockets of types E and F according to standard IEC 60083:2015.

According to a preferred embodiment, the flush-mounted box comprises a recess in the side wall of the hollow body at the level of the screw head of each clamp screw. The screw head is partially placed in the recess. A pattern in the screw head for receiving a screwdriver is positioned within the hollow volume of the flush-mounted box.

This embodiment is advantageous because it allows the dimensions of the flush-mounted box to be further reduced. The clamp screws are no longer positioned completely within the hollow volume of the flush-mounted box, as is usual with flush-mounted boxes for hollow walls. Consequently, a cover frame with smaller dimensions can also be used to hide the flush-mounted box. Because the pattern in the screw head is positioned within the hollow volume of the flush-mounted box, the clamp screws can be screwed in as usual with a screwdriver.

This embodiment is particularly advantageous for European sockets, in particular sockets of types E and F according to standard IEC 60083:2015.

According to a preferred embodiment, the flush-mounted box comprises a click system in the side wall of the hollow body for clicking an electrical base element into place. The click system preferably comprises flexible arms in the side wall. The flexible arms are prestressed inwards towards the hollow body. Optionally, the flexible arms comprise barbs. When placing an electrical base element in the flush-mounted box, the flexible arms first move outward until the electrical base element is placed deep enough in the flush-mounted box, after which the flexible arms move back to their original position and interact with cams or recesses on the electrical base element. The electrical base element is now clicked into place.

The click system is advantageous because it allows a smaller electrical base element to be used, which allows the dimensions of the flush-mounted box and/or the dimensions of the cover frame to be further reduced. Usually an electrical base element comprises clamps that can be moved outwards and clamp against the side wall of the flush-mounted box. The flush-mounted box must provide sufficient space around the electrical base element so that the clamps can be moved outward. Alternatively, an electrical base element usually comprises a mounting frame that is placed on the flush-mounted box outside the flush-mounted box and screwed to the flush-mounted box. This mounting frame must also be hidden by the cover frame. In this embodiment, the clamps and mounting frame for an electrical base element are unnecessary. The click system allows the flush-mounted box to fit more closely around the electrical base element and the cover frame can be made smaller because no mounting frame needs to be hidden or the cover frame can even be omitted completely.

According to a preferred embodiment, the flush-mounted box comprises cams for supporting an electrical base element. The cams extend transversely to the side wall in the hollow body of the flush-mounted box. The flush-mounted box preferably comprises at least two cams. Preferably, the two cams are a pair of opposing cams. It will be apparent that the flush-mounted box can comprise more than one pair of opposing cams, for example two pairs or three pairs of opposing cams. Alternatively, the flush-mounted box comprises more than two cams that may or may not be regularly distributed over a circular outline. Preferably, the cams are distributed regularly over the circular outline. The cams are advantageous for absorbing pressure forces on the electrical base element, for example when plugging a power cord into a socket or when pressing a light switch. By absorbing the pressure forces, the electrical base element is prevented from being pressed deeper into the flush-mounted box, viewed from the open base surface. This embodiment is particularly advantageous in combination with a previously described click system, wherein the click system prevents inadvertent removal and wherein the cams prevent inadvertently pressing the electrical base element deeper into the flush-mounted box.

According to a further embodiment, the flush-mounted box comprises two opposite cams, with a distance between two opposite cams of at least 25 mm, preferably at least 30 mm and more preferably at least 35 mm. This is advantageous for placing part of the electrical base element beyond the cams, so that, if necessary, an installation depth of the electrical base element is not limited by the cams.

This embodiment is particularly advantageous for European sockets, in particular sockets of types E and F according to standard IEC 60083:2015.

According to an embodiment, the hollow body has an open top surface opposite the open base surface. The clamp screws extend beyond the open top surface. The flush-mounted box comprises guides for guiding the clamps. The function of the guides is as described previously. The guides preferably have a U-shaped cross-section in a plane parallel to the open base surface. The guides extend transversely to the open top surface along the clamp screws. The guides preferably extend from the open top surface transversely to the open top surface. This embodiment is advantageous when connecting the electrical base element to cabling in the hollow wall. In a flush-mounted box according to the prior art, these connections are made in the flush-mounted box. A flush-mounted box according to the prior art usually comprises break-out parts for feeding the cabling through.

The flush-mounted box according to the current invention fits closely with the electrical base part. There is only limited space in the flush-mounted box for connecting the electrical cabling. The open top surface allows space in the hollow wall to be used for making the connections. The electrical base element is accessible all around for electrical cabling.

If applicable regulations require connections to be made in a junction box, the flush-mounted box can be placed in a junction box.

According to a further embodiment, the guides are connected at an end by a bridge. The bridge strengthens the guides against deformation. When clamping the flush-mounted box in the hollow wall, considerable forces are exerted on the clamps. Due to the protrusions comprised in the clamps, there is a force on the clamp screws, which presses the clamp screws inwards. As a result, the free ends of the protrusions may not press sufficiently against the inside of the hollow wall and the flush-mounted box may not be properly secured in the hollow wall. Without the bridge, the clamp screws and guides would move inward.

It will be apparent that if hollow body comprises a closed top surface, the closed top surface functions as a bridge.

According to an embodiment, each protrusion extends in a direction that makes an angle θ with the open base surface. The angle θ is at least 70° and at most 89°. The angle θ is preferably at least 75°, more preferably at least 80° and even more preferably at least 85°. The free end of each protrusion points in a direction away from the flush-mounted box. This embodiment is advantageous because when the clamp screws are tightened, the protrusions automatically have a centering effect, which presses the flange of the flush-mounted box firmly against the hollow wall.

This embodiment is particularly advantageous for European sockets, in particular sockets of types E and F according to standard IEC 60083:2015.

According to an embodiment, the flush-mounted box has a depth D. The depth D is measured in a direction transverse to the open base surface from the open base surface to a furthest point of the flush-mounted box according to the mentioned direction. The distance B is at least 30% of the depth D. The distance B is preferably at least 32% of the depth D, more preferably at least 34%, even more preferably at least 36% and even more preferably at least 38%.

The depth D of a flush-mounted box is related to a required installation depth for an electrical base element. A distance B that is at least 30% of the depth D is sufficient for most electrical base elements to place the clamp screws, viewed from the open base surface, behind a central part or behind the central part and part of the electrical base element.

This embodiment is particularly advantageous for European sockets, in particular sockets of types E and F according to standard IEC 60083:2015.

According to a further embodiment, the depth D is at most 56 mm, preferably at most 52 mm, more preferably at most 48 mm, even more preferably at most 44 mm and even more preferably at most 40 mm. Such a depth D is very advantageous for installation of an electrical base element in a thin hollow wall.

According to a preferred embodiment, the depth D is at most 44 mm, preferably at most 42 mm, more preferably at most 40 mm, even more preferably at most 38 mm and even more preferably at most 37 mm. The depth D is measured in a direction transverse to the open base surface from the open base surface to a furthest point of the flush-mounted box according to the mentioned direction. Such a depth D is very advantageous for installation of an electrical base element in a thin hollow wall, in particular sockets of type B according to standard IEC 60083:2015.

According to an embodiment, the protrusions of the clamps extend over a distance A of at least 13 mm, preferably at least 14 mm, more preferably at least 15 mm, even more preferably at least 16 mm and even more preferably at least 17 mm. Such a distance A ensures that the flush-mounted box can be secured in walls with a small thickness, for example plasterboards with a thickness of 9.5 mm.

This embodiment is particularly advantageous for European sockets, in particular sockets of types E and F according to standard IEC 60083:2015.

According to an embodiment, the hollow body is a cylinder or a truncated cone. The open base surface of the hollow body has a diameter of at least 36 mm. The diameter of the open base surface is measured on an inside of the hollow body in the open base surface.

The open base surface preferably has a diameter of 38 mm, more preferably 40 mm, even more preferably 42 mm and even more preferably 44 mm.

Such a diameter for the open base surface is sufficient for placing electrical base elements in the flush-mounted box, such as sockets and switches.

This embodiment is particularly advantageous for European sockets, in particular sockets of types E and F according to standard IEC 60083:2015.

According to an embodiment, the hollow body is a cylinder or a truncated cone. The open base surface of the hollow body preferably has a diameter of at least 31 mm. The diameter of the open base surface is measured on an inside of the hollow body in the open base surface.

The open base surface preferably has a diameter of at least 33 mm, more preferably at least 34 mm, even more preferably at least 35 mm and even more preferably at least 36 mm.

Such a diameter for the open base surface is sufficient for placing electrical base elements in the flush-mounted box, such as sockets and switches.

This embodiment is particularly advantageous for type B sockets according to standard IEC 60083:2015.

According to an embodiment, the hollow body is a cylinder or a truncated cone. The open base surface has a diameter of no more than 46 mm. The diameter of the open base surface is measured on an inside of the hollow body in the open base surface. The flange has an outer diameter of maximum 56 mm. The outer diameter of the flange is measured in the plane formed by the open base surface.

The diameter of the open base surface is preferably at most 44 mm, more preferably at most 42 mm, even more preferably at most 41 mm and even more preferably at most 40 mm.

The outer diameter of the flange is preferably at most 53 mm, more preferably at most 51 mm, even more preferably at most 49 mm, even more preferably at most 47 mm and most preferably at most 45 mm.

A flush-mounted box with dimensions within the given range is very advantageous because a much more limited surface area for the open base surface is achieved compared to a prior-art flush-mounted box, while there is still enough space to place an electric base element and a central part in the flush-mounted box. A cylinder or truncated cone as a hollow body is advantageous because a recess in a hollow wall for placing the flush-mounted box can easily be made with a hole saw. A cylinder or truncated cone as a hollow body is additionally advantageous because only a single electrical base element can be placed in the flush-mounted box, so that a cover frame only needs to cover the flush-mounted box around the electrical base element and not, for example, a space between two electrical base elements in the same flush-mounted box. As a result, the cover frame ensures minimal disruption. A cover frame may not even need to be used if the electrical base element fits closely enough to the flush-mounted box.

This embodiment is particularly advantageous for European sockets, in particular sockets of types E and F according to standard IEC 60083:2015.

According to a preferred embodiment, the hollow body is a cylinder or a truncated cone. The open base surface has a diameter of no more than 39 mm. The diameter of the open base surface is measured on an inside of the hollow body in the open base surface.

The diameter of the open base surface is preferably at most 38 mm, more preferably at most 37 mm, even more preferably at most 36 mm, even more preferably at most 35 mm, even more preferably at most 34 mm and most preferably at most 33 mm.

This embodiment is particularly advantageous for type B sockets according to standard IEC 60083:2015.

According to a further embodiment, the flange has an outer diameter of at most 45 mm. The outer diameter of the flange is measured in the plane formed by the open base surface.

The outer diameter of the flange is preferably at most 44 mm, more preferably at most 43 mm, and even more preferably at most 42 mm.

According to a preferred embodiment, the hollow body is a cylinder or a truncated cone. The clamps comprise a protrusion as in previously described embodiments. The clamps can be moved from a folded in position to a folded out position. The clamps comprise a curved surface. In the folded in position, the curved surface joins the hollow body. The protrusion comprised in the clamps is positioned at a first end of the curved surface. The clamps comprise a hinged arm at a second end of the curved surface, lying opposite the first end of the curved surface. The hinged arm extends perpendicular to the curved surface and parallel to the open base surface. The clamp screw is located at a free end of the hinged arm.

This embodiment is particularly advantageous in the event that an electrical base element, due to its dimensions, prevents the clamp screws from being placed near the side wall of the hollow body when the flush-mounted box fits closely to the electrical base element, for example, because the electrical base element extends deep into the flush-mounted box along the side wall. However, it is possible that the electrical base element extends less deeply into the flush-mounted box at positions further away from the side wall of the hollow body and the clamp screws can be positioned there under, along or through the electrical base. By using the hinged arm, the operation of the hinged arm remains unchanged and when the clamp screws are tightened, the clamps will move from the folded in position to the folded out position and then move along the side wall of the hollow body to the open base surface. This allows for a flush-mounted box with minimal dimensions to remain possible.

According to a preferred embodiment, the flush-mounted box comprises at least two clamps. In a plane parallel to the open base surface, there is an angle of at least 110° and at most 160° between a first clamp screw and a second clamp screw. A vertex of the angle mentioned coincides with a center of the circular outline on which the clamp screws are placed.

Preferably, the angle between the first clamp screw and the second clamp screw is at least 115°, more preferably at least 120°, even more preferably at least 125° and even more preferably at least 130°.

Preferably, the angle between the first clamp screw and the second clamp screw is at most 155°, more preferably at most 150°, even more preferably at most 145° and even more preferably at most 140°.

This embodiment is particularly advantageous for type B sockets according to standard IEC 60083:2015. Because there is an angle of at least 110° and at most 160° between the first clamp and the second clamp, it is possible to move the clamp screws further inside the flush-mounted box. The first clamp screw or the second clamp screw is located on the circular outline between two contact points of the socket. The second clamp screw or the first clamp screw, respectively, is then located between a contact point and a grounding point of the socket.

According to an embodiment, the flush-mounted box comprises two clamps. The flush-mounted box preferably contains two clamps. The two clamps can be moved along the hollow body to a plane formed by the flange by tightening their clamp screw. The two clamps can be moved from a folded in position to a folded out position. Centerlines of the clamp screws of the two clamps lie on a circle. The said circle is concentric with an outline of the open base surface. Viewed in a plane parallel to the plane formed by the flange, a first of the two clamps extends from the clamp screw of the first clamp for a greater distance than a second of the two clamps extends from the clamp screw of the second clamp. The first clamp preferably extends arcuately from the clamp screw of the first clamp. A central angle of a circular arc on the said circle with the centerlines of the clamp screws of the first clamp and the second clamp as end points is at least 110° and at most 160°. The central angle is the angle determined by the center of the said circle as a vertex, a line through the centerline of the clamp screw of the first clamp and a line through the centerline of the clamp screw of the second clamp.

Preferably, the central angle is at least 115°, more preferably at least 120°, even more preferably at least 125° and even more preferably at least 130°.

Preferably, the central angle is at most 155°, more preferably at most 155°, even more preferably at most 145° and even more preferably at most 140°.

This embodiment is advantageous because due to the greater length of the first clamp compared to the second clamp, the first clamp in the folded out position extends further from the hollow body than the second clamp. In the folded out position, the first clamp reaches at least to a diameter of the mentioned circle through the centerline of the clamp screw of the second clamp. As a result, the first clamp and the second clamp, after perpendicular projection onto the plane formed by the flange, can be clamped diametrically with respect to a central point of a cross-section of the hollow body in the said plane, against a rear side of the wall, thereby achieving a very good clamping of the flush-mounted box.

This embodiment is particularly advantageous in combination with a socket of type B according to standard IEC 60083:2015. Because the first clamp is longer than the second clamp, the clamp screws do not have to be diametrically opposite each other on the aforementioned circle and it is also possible to move the clamp screws further inside the flush-mounted box. The clamp screw of the first clamp is located between the first contact point and a grounding point of the socket. The clamp screw of the second clamp lies on the said circle between a first and a second contact point of the socket. With a type B socket it is not possible to place the clamp screws diametrically opposite each other on the mentioned circle.

According to a preferred embodiment, the flush-mounted box comprises three clamps. The flush-mounted box preferably contains three clamps. In a plane parallel to the open base surface, there is an angle of at least 110° and at most 160° between a first clamp screw and a second clamp screw. There is an angle of at least 110° and at most 160° between the first clamp screw and a third clamp screw. Preferably, the angle between the first clamp screw and the second clamp screw is equal to the angle between the first clamp screw and the third clamp screw. A vertex of the angles mentioned coincides with a center of the circular outline on which the clamp screws are placed. It will be apparent that the first clamp screw is the clamp screw of a first clamp, the second clamp screw is the clamp screw of a second clamp and the third clamp screw is the clamp screw of a third clamp.

Preferably, the angle between the first clamp screw and the second clamp screw is at least 115°, more preferably at least 120°, even more preferably at least 125° and even more preferably at least 130°.

Preferably, the angle between the first clamp screw and the second clamp screw is at most 155°, more preferably at most 150°, even more preferably at most 145° and even more preferably at most 140°.

Preferably, the angle between the first clamp screw and the third clamp screw is at least 115°, more preferably at least 120°, even more preferably at least 125° and even more preferably at least 130°.

Preferably, the angle between the first clamp screw and the third clamp screw is at most 155°, more preferably at most 150°, even more preferably at most 145° and even more preferably at most 140°.

This embodiment is particularly advantageous for type B sockets according to standard IEC 60083:2015. Because the three clamp screws are not evenly distributed over the circular outline, it is possible to move the clamp screws further inside the flush-mounted box. The first clamp screw lies on the circular outline between a first and a second contact point of the socket. The second clamp screw is located between the first contact point and a grounding point of the socket. The third clamp screw is located between the second contact point and the grounding contact.

According to a preferred embodiment, a screw head of the at least one clamp screw rests against a support surface. The support surface forms a cam for supporting an electrical base element. This means that the electrical base element rests against the support surface next to the screw head of the clamp screw. Preferably, the support surface comprises a recess for recessed reception of the screw head. The cam extends transversely to the side wall in the hollow body of the flush-mounted box. This embodiment is particularly advantageous because no additional space needs to be provided in the flush-mounted box for cams, leaving more space for an electrical base element and so that the flush-mounted box can fit more closely around the electrical base element.

In a second aspect, the invention concerns an assembly of a flush-mounted box and an electrical base element.

The flush-mounted box is a flush-mounted box according to the first aspect. The electrical base element is placed in the hollow body of the flush-mounted box. A functional part of the electrical base element is accessible through the open base surface in the flush-mounted box.

This assembly has the advantage that there is only a very narrow gap between the hollow wall and the functional part of the electrical base element. This means that a cover frame only needs to be very limited, for example to cover the flange of the flush-mounted box, or it is even completely unnecessary to use a cover frame, for example if the flange can remain visible.

According to a preferred embodiment, a central part is placed on the electrical base element. The central part covers the electrical base element. The central part covers the clamp screws. This means that if there are multiple clamps, all clamp screws are covered by the central part. This is advantageous because it prevents the clamp screws from being visible. This also means that the dimensions of the flush-mounted box are minimal.

According to a further embodiment, the central part covers the flange of the flush-mounted box. This embodiment is advantageous because the flange of the flush-mounted box is not visible and does not have to be finished. An additional advantage is that this also eliminates the need for a separate cover frame to cover the flange.

According to an embodiment, the electrical base element is screwed into the flush-mounted box with at least one screw. The flush-mounted box preferably comprises at least one bushing for receiving at least one screw. The electrical base element is completely positioned in the flush-mounted box. There is no mounting frame that is placed outside the flush-mounted box on the flush-mounted box and screwed to the flush-mounted box.

According to a preferred embodiment, the electrical base element has an outer diameter that is at most 2.0 mm smaller than an inner diameter of the open base surface. The outer diameter is measured in a plane in which the open base surface is located. Preferably, the outer diameter is at most 1.9 mm smaller than the inner diameter, more preferably at most 1.8 mm, even more preferably at most 1.7 mm and even more preferably at most 1.6 mm. This is advantageous because it makes it unnecessary to use a cover frame, in particular in combination with a previously described embodiment in which the clamp screws are covered by the central part. It is also advantageous that the gap between the electrical base element and the flush-mounted box is sufficiently small so that live parts of the electrical base element cannot be touched.

According to a preferred embodiment, the electrical base element is a type B socket according to standard IEC 60083:2015. The socket comprises a central part. The central part may or may not be removably placed on the socket. The central part is preferably located in the open base surface of the flush-mounted box.

According to a further embodiment, the flush-mounted box comprises at least two clamps. The clamp screws of the at least two clamps are located on a circular outline. A first clamp screw is located between a first contact point and a second contact point of the socket. The first contact point and the second contact point are the contact points for connecting a device to an electrical network. A second clamp screw is located between the first contact point and the grounding contact. The grounding contact is the contact for connecting a round earth pin of a plug. Preferably, the flush-mounted box comprises three clamps, more preferably the flush-mounted box contains three clamps. The three clamps are located on the aforementioned circular outline. A third clamp screw is located between the second contact point and the grounding contact. This means that a connecting line between the first clamp screw and the center of the circular outline on which the clamp screws of the flush-mounted box are placed, lies between a connecting line between the first contact point and the said center and a connecting line between the second contact point and the said center. This means that a connecting line between the second clamp screw and the said center lies between the connecting line between the first contact point and the said center and a connecting line between the grounding contact and the said center. This means that a connecting line between the third clamp screw and the said center lies between the connecting line between the second contact point and the said center and the connecting line between the grounding contact and the said center.

This embodiment is advantageous because the position of the clamps does not hinder the installation of the socket in the flush-mounted box. This makes it possible to move the clamp screws further inside the flush-mounted box. The clamps do not come into contact with the contact points and the grounding contact. The position of the clamps even allows protection for the contact points. This embodiment is particularly advantageous in combination with a previously described embodiment of the flush-mounted box, in which there is an angle of at least 110° and at most 160° between the first and the second clamp screw and between the first and the third clamp screw.

According to an embodiment, the assembly comprises a removable ring. The removable ring has a recess on an inner outline. The recess is suitable for receiving the flange of the flush-mounted box. The recess has an inner edge with a diameter equal to an inner diameter of the ring. The recess has an outer edge with a diameter that is preferably at most 1.5 mm larger than the diameter of the central part, more preferably at most 1.0 mm and even more preferably at most 0.5 mm. This means that the central part fits closely to the removable ring. After placing the assembly in a wall, the removable ring is clamped between the flange of the flush-mounted box and the wall.

This embodiment is advantageous because after placement the removable ring covers the wall at an edge of an opening in the wall in which the flush-mounted box is placed. This results in a neat finish. If the wall is damaged at the edge of the opening when making the opening, such as splinters in the case of wooden board material or small chips in the case of stone board material, the removable ring will cover this minor damage. Thus, there is no need to repair or touch up the edge of the opening.

This embodiment is also advantageous in combination with an embodiment of the method described below, in which a mounting plate is placed on the hollow wall. This mounting plate is plastered. When plastering the mounting plate, it is possible that the plaster around the opening for the flush-mounted box in the hollow wall is not completely flat or does not completely fit the opening. The removable ring covers the plaster around the opening, creating a neat finish.

In a third aspect, the invention concerns a method for installing an electrical base element in a hollow wall.

According to a preferred embodiment, the method comprises the steps of:
  providing a flush-mounted box comprising a hollow body with an open base surface and a side wall, a flange around the open base surface, at least one clamp for clamping the flush-mounted box in the hollow wall and a clamp screw through the at least one clamp, wherein the flange extends in a direction parallel to the open base surface and away from the body, wherein the hollow body is a cylinder or a truncated cone, wherein the hollow body can be placed in a cylindrical space up to the flange,
  making an opening for the flush-mounted box in the hollow wall,
  placing the flush-mounted box in the opening in the hollow wall, wherein the hollow body is positioned through the opening in the hollow wall and wherein the flange rests against the hollow wall,
  tightening the clamp screws, wherein the at least one clamp moves along the side wall to the open base surface and clamps against a rear side of the hollow wall,
  connecting an electrical base element to cabling in the hollow wall,
  placing the electrical base element in the flush-mounted box.

The hollow wall is, for example, a wooden or metal frame covered with plasterboard, a furniture wall or a backsplash in a kitchen, etc.

When carrying out the method, a flush-mounted box according to the first aspect is used.

The flush-mounted box preferably comprises at least two clamps, whereby the at least two clamps clamp against the rear of the hollow wall by screwing the clamp screws.

Optionally, a cover frame is placed after placing the electrical base element in the flush-mounted box.

It will be apparent to one skilled in the art that a number of steps of the method can be performed in a different order.

For example, depending on an embodiment of the flush-mounted box, before placing the flush-mounted box in the hollow wall, the cabling in the hollow wall can be placed in the flush-mounted box and connected to the electrical base element.

This method has the advantage, among other things, that an electrical base element can be placed in the hollow wall in a manner familiar and simple to a person skilled in the art. A person skilled in the art does not have to take any additional actions or steps compared to a flush-mounted box known from the prior art. By using a flush-mounted box according to the first aspect, the flush-mounted box fits more closely around the electrical base element, so that a smaller cover frame can be used to hide the flush-mounted box or even no cover frame needs to be used, as a result of which the visual impact of the cover frame is limited or even non-existent compared to conventional cover frames. An installer does not need to have any skills in plastering to carry out the method.

According to an embodiment, a recess is provided around the opening. Preferably, the recess is milled into the wall. The recess is suitable for receiving the flange. This is advantageous for a completely flush mounting of the socket in the wall. In combination with the minimum dimensions of the flush-mounted box, it appears as if the wall runs flush. The wall is only visually disturbed to a very minimal extent. Preferably, the recess fits around the flange. This is advantageous because the wall does not have to be further finished after installation of the flush-mounted box.

According to an embodiment, the method comprises the additional step of creating a hollow wall. The hollow wall is created locally in a solid wall by making a large opening in the solid wall, after which the opening is covered with board material. Non-exhaustive examples of suitable board material are plasterboard, MDF panels (Medium Density Fiberboard), OSB panels (Oriented Strand Board), etc. The board material preferably lies in the plane of the solid wall. The board material forms a hollow wall with the opening behind it. The opening for the flush-mounted box is made in the board material. The board material is preferably covered, painted, or finished in another suitable manner with a plaster layer, veneer or wallpaper. Preferably, the board material is finished in the same way as the solid wall, so that the board material is invisible.

According to a preferred embodiment, the electrical base element is clicked into the side wall of the hollow body with the aid of a click system. The click system preferably comprises flexible arms in the side wall. The flexible arms are prestressed inwards towards the hollow body. Optionally, the flexible arms comprise barbs. When placing an electrical base element in the flush-mounted box, the flexible arms first move outward until the electrical base element is placed deep enough in the flush-mounted box, after which the flexible arms move back to their original position and interact with cams or recesses on the electrical base element.

This embodiment is advantageous because, as described previously, due to the absence of clamps or a mounting frame, a smaller electrical base element can be used, which allows the dimensions of the flush-mounted box and/or the dimensions of the cover frame to be further reduced or the cover frame is even superfluous.

According to a preferred embodiment, a central part is placed on the electrical base element. The central part covers the electrical base element. The clamp screws of the flush-mounted box are covered by the central part. This is advantageous because it prevents the clamp screws from being visible. This also means that the dimensions of the flush-mounted box are minimal.

According to an embodiment, a cover frame is placed. The cover frame hides the flange of the flush-mounted box. The cover frame has a concentric inner outline and outer outline. There is a gap of no more than 1 mm between the inner outline and the central part. Between the inner outline and the outer outline of the cover frame, measured in a plane parallel to the open base surface, there is a distance of at most 5.0 mm, preferably at most 4.0 mm, more preferably at most 3.5 mm and even more preferably at most 3.0 mm.

It will be apparent that if the flush-mounted box comprises several electrical base elements placed next to each other, the inner outline of the cover frame has several intermediate connections that separate the central parts of the electrical base elements placed next to each other. The intermediate connections are not considered part of the inner outline.

This embodiment is very advantageous because a cover frame has a very minimal size and is virtually invisible from a distance.

According to a preferred embodiment, a junction box is placed behind the hollow wall before placing the flush-mounted box in the hollow wall. The flush-mounted box is placed in the junction box through the opening in the hollow wall. The electrical base element is connected to the cabling in the junction box. This embodiment is particularly advantageous if the flush-mounted box has an open top surface. If applicable regulations require connections to be made in a junction box, this is achieved by first placing a junction box and then placing the flush-mounted box in the junction box.

According to a preferred embodiment, the electrical base element is a type B socket according to standard IEC 60083:2015. Such a socket is very suitable for installation in a flush-mounted box according to the first aspect, where the use of a cover frame is even unnecessary.

According to a preferred embodiment, the screw head of the at least one clamp screw rests against a support surface. The support surface is comprised in the flush-mounted box. Preferably, the support surface comprises a recess for recessed reception of the screw head. The support surface forms a cam for supporting an electrical base element. The cam extends transversely to the side wall in the hollow body of the flush-mounted box. When placing the electrical base element in the flush-mounted box, a surface of the electrical base element is placed against the cam. This means that the electrical base element rests against the support surface next to the screw head of the clamp screw. This embodiment is particularly advantageous because no additional space needs to be provided in the flush-mounted box for cams, leaving more space for an electrical base element and so that the flush-mounted box can fit more closely around the electrical base element.

According to an embodiment, before placing the flush-mounted box in the opening in the hollow wall, the flush-mounted box is placed through a removable ring.

The ring has a recess on an inner outline. The flange of the flush-mounted box is accommodated in the recess. The recess has an inner edge with a diameter equal to an inner diameter of the ring. The recess has an outer edge with a diameter that is preferably at most 1.5 mm larger than the diameter of the central part, more preferably at most 1.0 mm and even more preferably at most 0.5 mm. This means that the central part fits closely to the removable ring. The removable ring is clamped between the flange of the flush-mounted box and the hollow wall.

This embodiment is advantageous because after placement of the flush-mounted box in the hollow wall, the removable ring covers the hollow wall at an edge of an opening in the hollow wall in which the flush-mounted box is placed. This results in a neat finish. If the hollow wall is damaged at the edge of the opening when making the opening, such as splinters in the case of wooden board material or small chips in the case of stone board material, the removable ring will cover this minor damage. Thus, there is no need to repair or touch up the edge of the opening.

According to an embodiment, the method comprises the additional step of placing a mounting plate on a front side of the hollow wall. The mounting plate comprises a cylindrical wall extending on the mounting plate. The cylindrical wall has an open base surface and an open top surface. The cylindrical wall bounds a cylindrical space. The mounting plate is interrupted at the open base surface. The mounting plate is glued, screwed or secured in another suitable manner to the front of the hollow wall. The mounting plate is plastered up to the open base surface of the cylindrical wall. The cylindrical space extends through the round opening in the hollow wall to the rear of the hollow wall. The flush-mounted box is placed into the cylindrical space through the round opening in the hollow wall. While tightening the at least one clamp, the at least one clamp clamps against the rear side of the hollow wall or against the cylindrical wall.

Preferably, the mounting plate comprises a recess for receiving the flange of the flush-mounted box. This is advantageous because it allows the flange to be recessed not in the hollow wall, but in the mounting plate. This is particularly advantageous with thin hollow walls, where a recessed placement of the flange in the hollow wall can lead to fracture of the hollow wall at the round opening.

This embodiment is particularly advantageous in combination with a previously described embodiment, in which the flush-mounted box is placed through a removable ring. When plastering the mounting plate, it is possible that the plaster around the opening for the flush-mounted box in the hollow wall is not completely flat or does not completely fit the opening. The removable ring covers the plaster around the opening, creating a neat finish.

One skilled in the art will appreciate that a method according to the third aspect is preferably performed using a flush-mounted box according to the first aspect and that a flush-mounted box according to the first aspect is preferably configured for performing a method according to the third aspect. Each feature described in this document, both above and below, can therefore relate to any of the three aspects of the present invention.

In what follows, the invention is described by means of non-limiting figures illustrating the invention, which are not intended or should be interpreted to limit the scope of the invention.

DESCRIPTION OF THE FIGURES

FIG. 1 shows a side view of a flush-mounted box according to an embodiment of the present invention.

The flush-mounted box (1) comprises a hollow body (2). The hollow body (2) in this embodiment is a cylindrical body with a diameter of 45 mm. The hollow body (2) has an open base surface (3), a side wall (4) and an open top surface (14). The flush-mounted box (1) comprises a flange (2) around the open base surface (3). The flange (5) and an outline of the open base surface (3) are concentric. This is more clearly visible in FIG. 2. The flange (5) has an outer diameter in this embodiment of 50.6 mm. The flange (5)

extends in a direction parallel to the open base surface (3) and away from the hollow body (2). The flush-mounted box (1) comprises two clamps (6) for clamping the flush-mounted box (1) in a hollow wall. The flush-mounted box (1) comprises a clamp screw (7) through each of the two clamps (6). This is more clearly visible in FIG. 3. The clamp screws (7) extend beyond the open top surface (14). The flush-mounted box (1) comprises guides (15) that extend from the open top surface (14) and transversely to the open top surface (14). The guides (15) are connected by a bridge (16). The two clamps (6) comprise a protrusion (8). After placement of the flush-mounted box (1) in a hollow wall, the protrusions (8) extend outside the hollow body (2) to the open base surface (3) over a distance A (A). The distance A (A) is measured in a direction transverse to the open base surface (3) from a point closest to the open base surface (3) where the clamp screw (7) intersects the clamp (6) to a free end (9) of the protrusion (8). The distance A (A) in this specific embodiment is 17.7 mm. Each protrusion (8) makes an angle θ (θ) with the open base surface (3) of at least 70° and at most 89°, with the free end (9) pointing in a direction away from the flush-mounted box (1). In this specific embodiment, the angle θ (θ) is 83°. The flush-mounted box (1) comprises two pairs of opposing cams (13) for supporting an electrical base element. Only a single cam (13) is visible in FIG. 1. The cams (13) extend transversely to the side wall (4) in the hollow body (2). This is more clearly visible in FIG. 4. The flush-mounted box (1) comprises a click system (12) in the side wall (4) for clicking into place an electrical base element. The click system (12) comprises flexible arms that are prestressed inwards towards the hollow body (2). In this specific embodiment, the click system (12) comprises two pairs of flexible arms. This is even clearer in FIG. 2. The flush-mounted box (1) has a depth D (D). The depth D (D) is measured in a direction transverse to the open base surface (3) from the open base surface (3) to a furthest point of the flush-mounted box (1) according to the mentioned direction. The depth D (D) in this specific embodiment is 54 mm.

Figure 2:
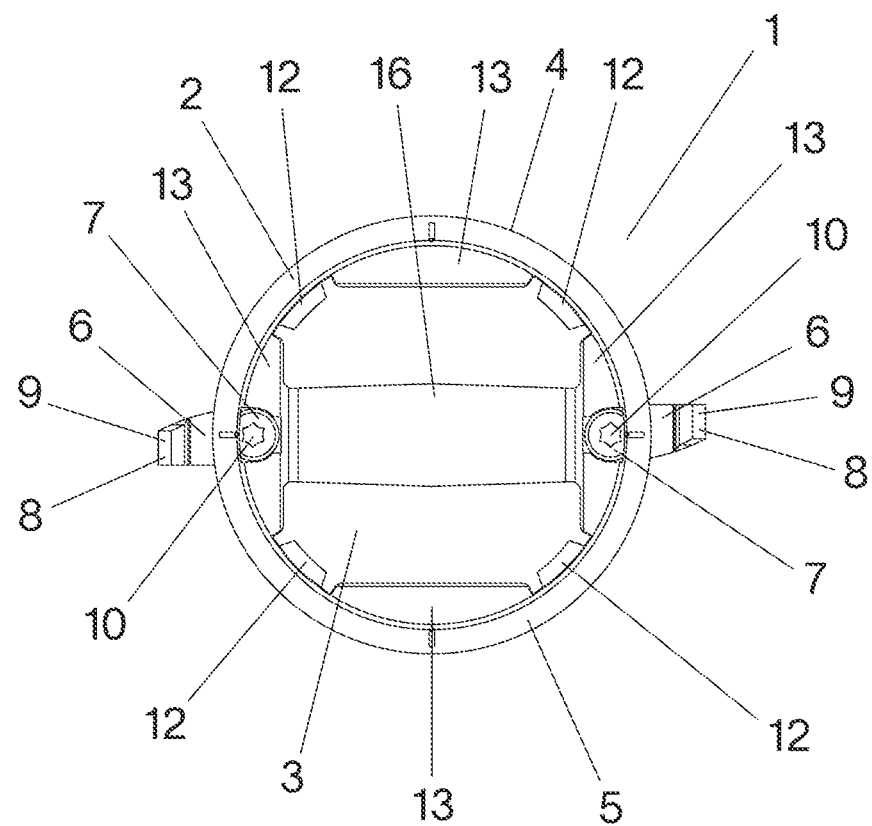
FIG. 2 shows a front view of a flush-mounted box according to an embodiment of the present invention.

FIG. 2 shows a front view of a flush-mounted box according to an embodiment of the present invention.

The flush-mounted box (1) in FIG. 2 is identical to the flush-mounted box (1) in FIG. 1. FIG. 2 clearly shows how the two pairs of flexible arms of the click system (12) are prestressed in an inward direction. The flexible arms of each pair are opposite. It is also clearly visible how the two pairs of opposite cams (13) form a support surface for supporting an electrical base element. When pressing on the electrical base element, the electrical base element will rest on the cams (13), so that the electrical base element cannot be pressed deeper into the flush-mounted box (1). The side wall (4) has a recess (11) at the level of each screw head (10) of the clamp screws (7). The recess (11) is not visible here but is in FIGS. 3 and 4. The screw head (10) is partially placed in the recess (11). A pattern in the screw head (10) for receiving a screwdriver is positioned within the hollow volume (2) of the flush-mounted box (1). Also visible in FIG. 2 is an intermediate distance between two opposing cams (3). The intermediate distance in this embodiment is 35 mm. This intermediate distance is advantageous for placing part of the electrical base element beyond the cams (3), so that, if necessary, an installation depth of the electrical base element is not limited by the cams (3).

Figure 3:
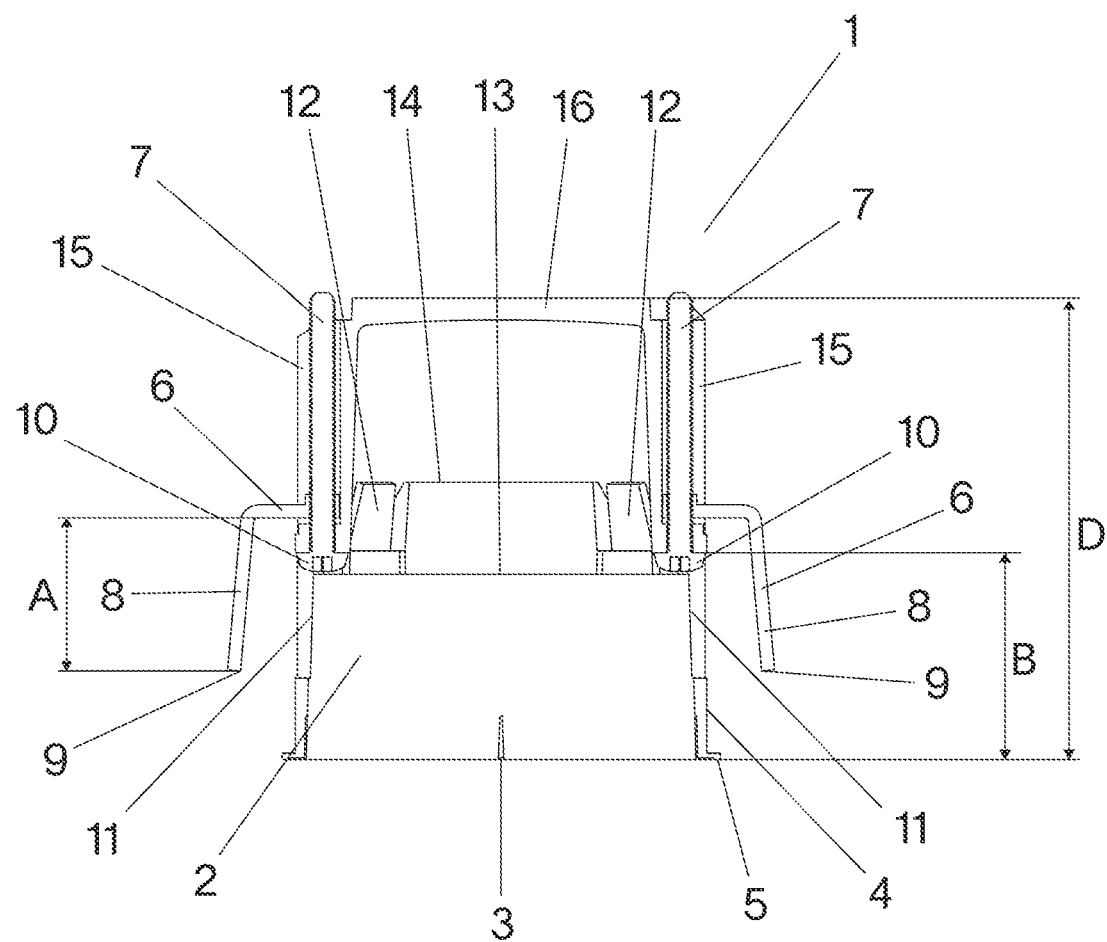
FIG. 3 shows a cross-sectional view of a flush-mounted box according to an embodiment of the present invention.

FIG. 3 shows a cross-sectional view of a flush-mounted box according to an embodiment of the present invention.

The flush-mounted box (1) in FIG. 3 is identical to the flush-mounted boxes (1) in FIGS. 1 and 2. FIG. 3 shows how the clamp screws (7) protrude through an internally threaded openings in the clamp (8). By tightening the clamp screws (7) and because the clamps (8) cannot rotate around the clamp screws (7) due to the guides (15), the clamps (8) move along the side wall (4) to the open base surface (3). It is also clearly visible that the screw heads (10) of the clamp screws (7) rest against a support surface, with the support surface located in the flush-mounted box (1) at a distance B (B) from the open base surface (3). The distance B (B) is measured from the open base surface (3) and in a direction transverse to the open base surface (3). The distance B (B) in this specific embodiment is 21.4 mm. The distance A (A) is therefore 83% of the distance B (B) in this specific embodiment. In this specific embodiment, the distance B (B) is rounded to 40% of the depth D (D). FIG. 3 shows how the screw head is partially placed in the recess (11) in the side wall (4).

Figure 4:
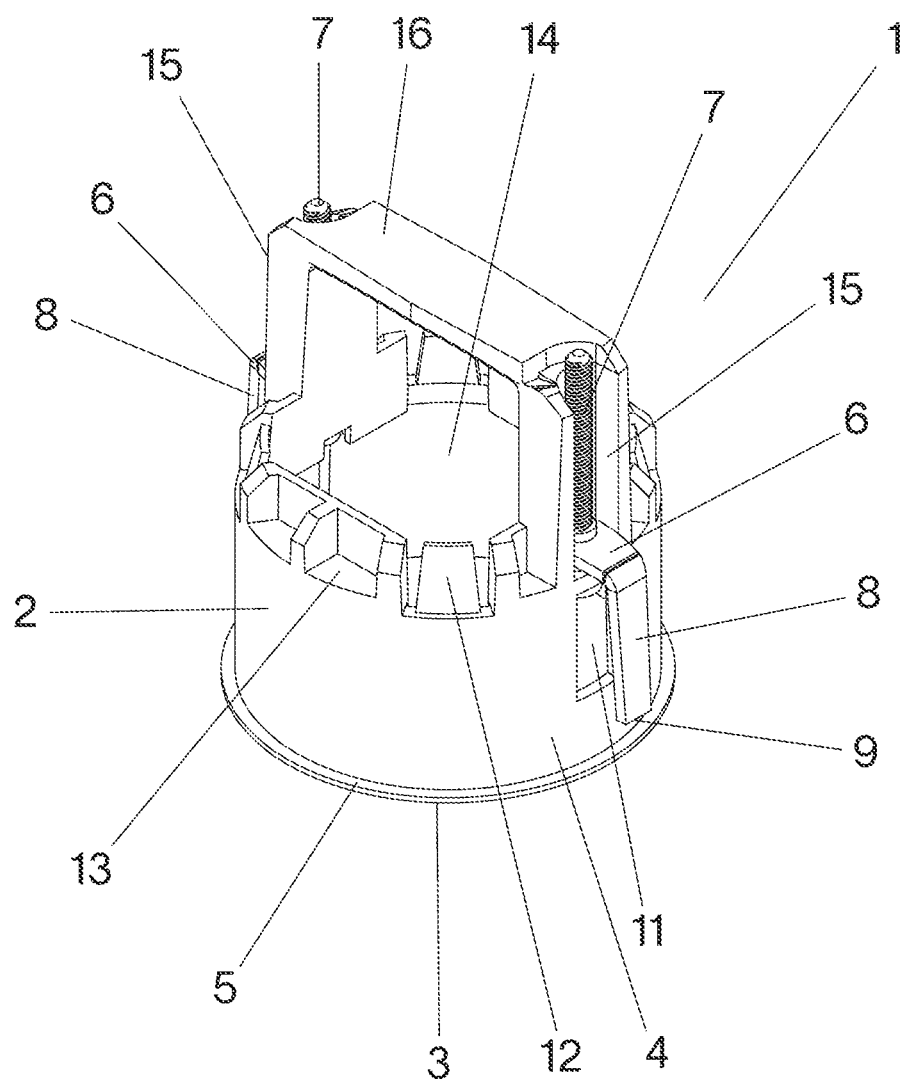
FIG. 4 shows a perspective view of a flush-mounted box according to an embodiment of the present invention.

FIG. 4 shows a perspective view of a flush-mounted box according to an embodiment of the present invention.

The flush-mounted box (1) in FIG. 4 is identical to the flush-mounted boxes (1) in FIGS. 1, 2 and 3. FIG. 4 clearly shows how the cams (13) extend transversely to the side wall (4). The recesses (11) are also clearly visible.

Figure 5:
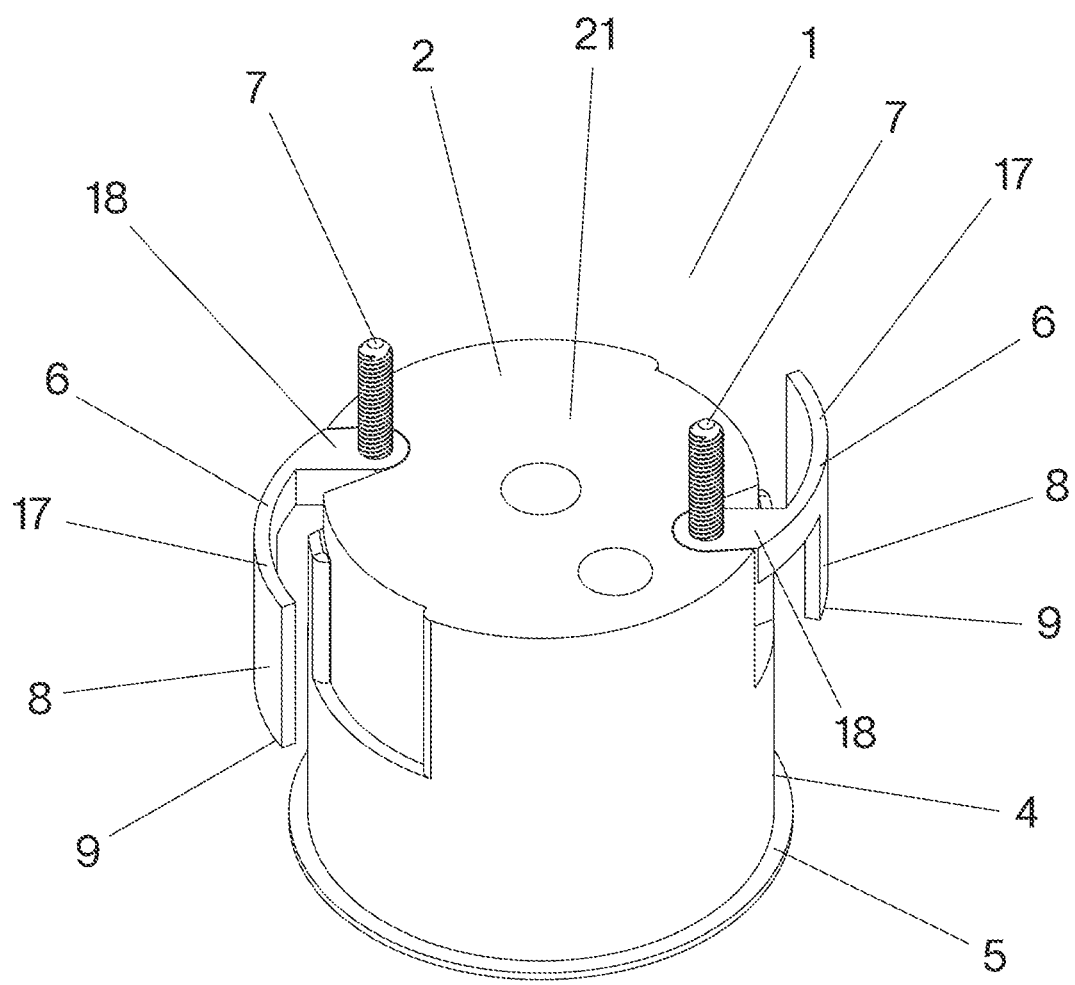
FIG. 5 shows a perspective view of a flush-mounted box according to an alternative embodiment of the present invention.

FIG. 5 shows a perspective view of a flush-mounted box according to an alternative embodiment of the present invention.

The flush-mounted box (1) comprises a hollow body (2). The hollow body (2) in this embodiment is a cylindrical body with a diameter of 41 mm. The hollow body (2) has an open base surface (3), a side wall (4) and a closed top surface (21). The open base surface (3) is not visible in FIG. 5. The open base surface has a diameter of 39 mm. The flush-mounted box (1) comprises a flange (2) around the open base surface (3). The flange (5) and an outline of the open base surface (3) are concentric. This is more clearly visible in FIG. 8. The flange (5) has an outer diameter in this embodiment of 44 mm. The flange (5) extends in a direction parallel to the open base surface (3) and away from the hollow body (2). The flush-mounted box (1) comprises two clamps (6) for clamping the flush-mounted box (1) in a hollow wall. The clamps (6) can be moved from a folded in position to a folded out position. FIG. 5 shows the clamps (6) in the folded out position. The clamps (6) comprise a curved surface (17). In the folded in position, the curved surface (17) connects to the hollow body (2). The folded in position is clearly visible in FIG. 10 and the folded out position in FIG. 11. The two clamps (6) comprise a protrusion (8) positioned at a first end of the curved surface (17). The clamps (6) comprise a hinged arm (18) at a second end of the curved surface (17), opposite the first end. The hinged arm (18) extends transversely to the curved surface (17) and parallel to the open base surface (3). The flush-mounted box (1) comprises a clamp screw (7) through each of the two clamps (8). The clamp screw (7) is located at a free end of the hinged arm (18). After placement of the flush-mounted box (1) in a hollow wall, the protrusions (8) extend outside the hollow body (2) to the open base surface (3) over a distance A (A). The distance A (A) is measured in a direction transverse to the open base surface (3) from a point closest to the open base surface (3) where the clamp screw (7) intersects the hinged arm (18) of the clamp (6) to a free end (9) of the protrusion (8). The distance A (A) in this specific embodiment is 12 mm. The distance A (A) is more clearly visible in FIG. 6. The hinged arms (18) make it possible to place the clamp screws (7) further from the side wall (4) of the hollow body (2). In this case the clamp screws (7) extend through an electrical base element (19). This is clearly visible in FIG. 7 and FIG. 8. The electrical base element (19) in this specific embodiment is a socket.

Figure 6:
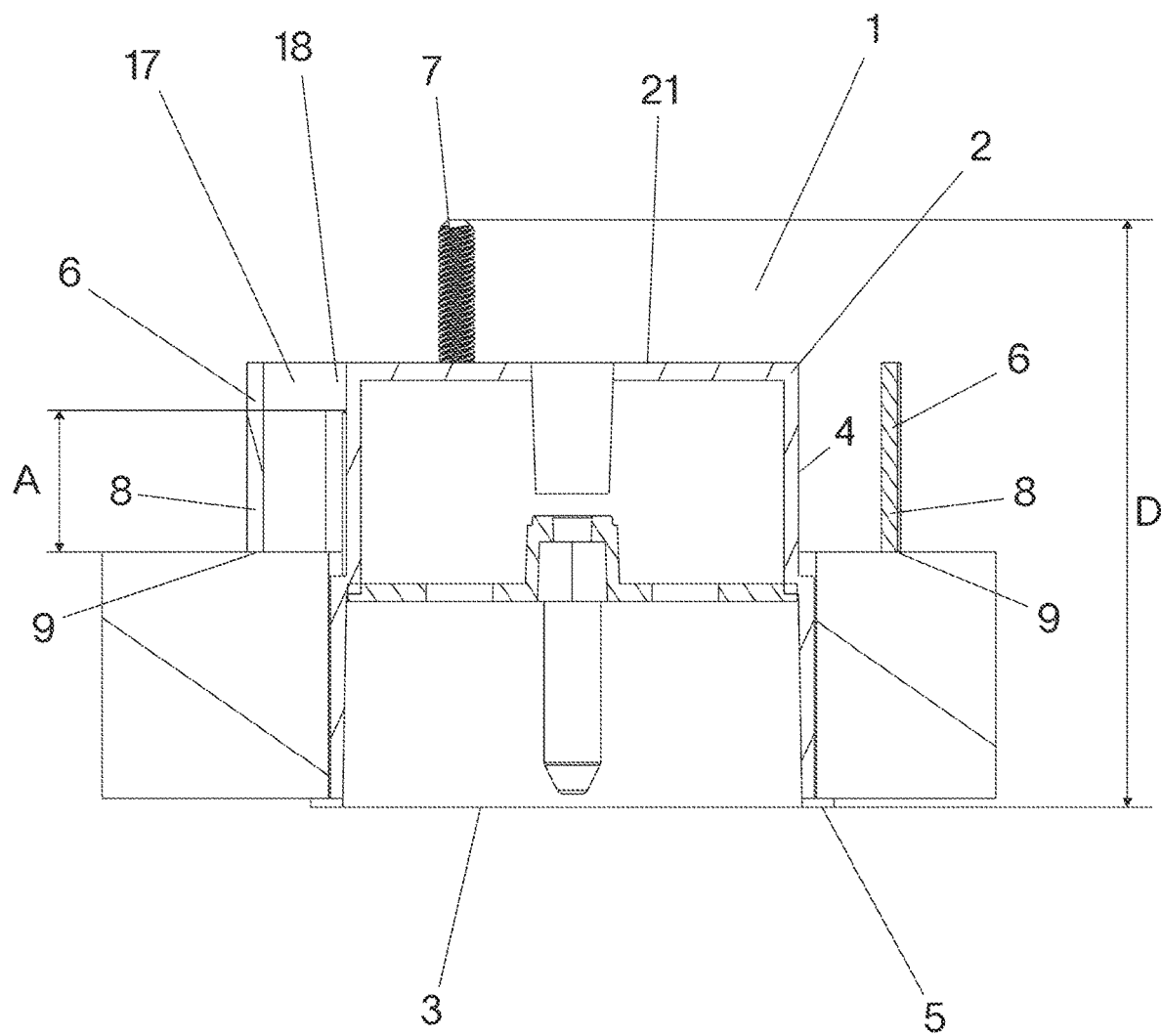
FIG. 6 shows a cross-sectional view of a flush-mounted box with electrical base element according to an alternative embodiment of the present invention.

FIG. 6 shows a cross-sectional view of a flush-mounted box with electrical base element according to an alternative embodiment of the present invention.

The flush-mounted box (1) and the electrical base element (19) in FIG. 6 are identical to the flush-mounted box (1) and the electrical base element (19) in FIG. 5. The flush-mounted box (1) is placed in a hollow wall (22) in FIG. 6. The flange (5) rests on a front side of the hollow wall (22) and the free ends (9) of the protrusions (8) press on an opposite rear side of the hollow wall (22). The distance A (A) is clearly visible in FIG. 6. The flush-mounted box (1) has a depth D (D). The depth D (D) is measured in a direction transverse to the open base surface (3) from the open base surface (3) to a furthest point of the flush-mounted box (1) according to the mentioned direction. The depth D (D) in this specific embodiment is 37 mm. The clamp screws (7) comprise screw heads (10). The screw heads (10) of the clamp screws (7) rest against a support surface, with the support surface located in the flush-mounted box (1) at a distance B (B) from the open base surface (3). The distance B (B) is measured from the open base surface (3) and in a direction transverse to the open base surface (3). The clamp screws (7) are not in the cross-section, so that the support surface against which the screw heads (10) rest and the screw heads (10) themselves are not visible in FIG. 6. The distance B (B) in this specific embodiment is 17 mm. The distance A (A) is therefore 70% of the distance B (B) in this specific embodiment. In this specific embodiment, the distance B (B) is rounded to 46% of the depth D (D).

Figure 7:
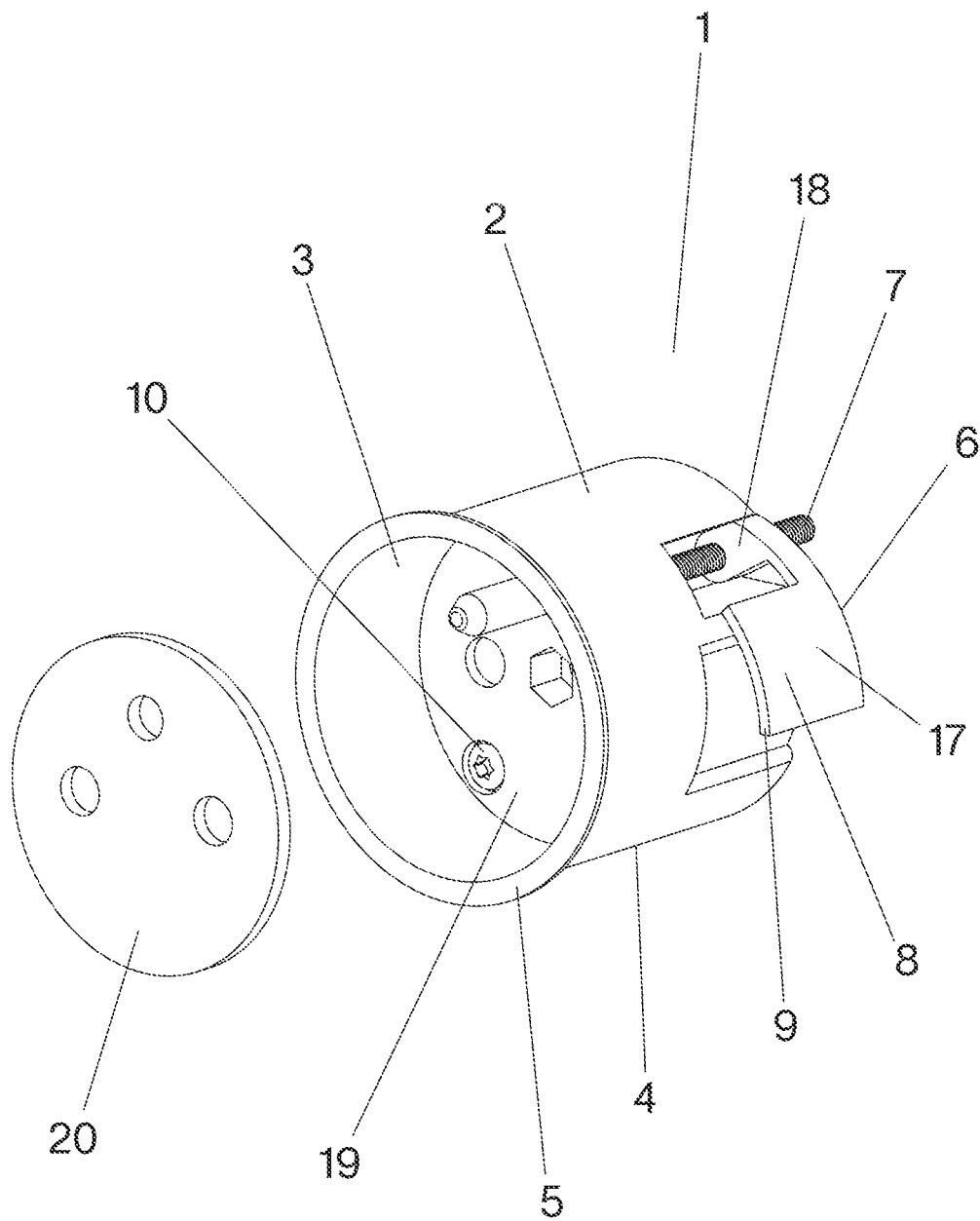
FIG. 7 shows a perspective view of a flush-mounted box with an electrical base element and a central part that has not yet been placed according to an alternative embodiment of the current invention.

FIG. 7 shows a perspective view of a flush-mounted box with an electrical base element and a central part that has not yet been placed according to an alternative embodiment of the current invention.

The flush-mounted box (1) and the electrical base element (19) in FIG. 7 are identical to the flush-mounted box (1) and the electrical base element (19) in FIGS. 5 and 6. FIG. 7 clearly shows how the screw heads (10) of the clamp screws (7) extend through the electrical base element (19). The screw heads (10) will be covered by the central part (20) after placement of the central part (20) in the flush-mounted box (1). FIG. 7 also shows a central recess for a nut, for attaching the electrical base element (19) to the flush-mounted box (1) using a bolt. This central recess will also be covered by the central part (20).

Figure 8:
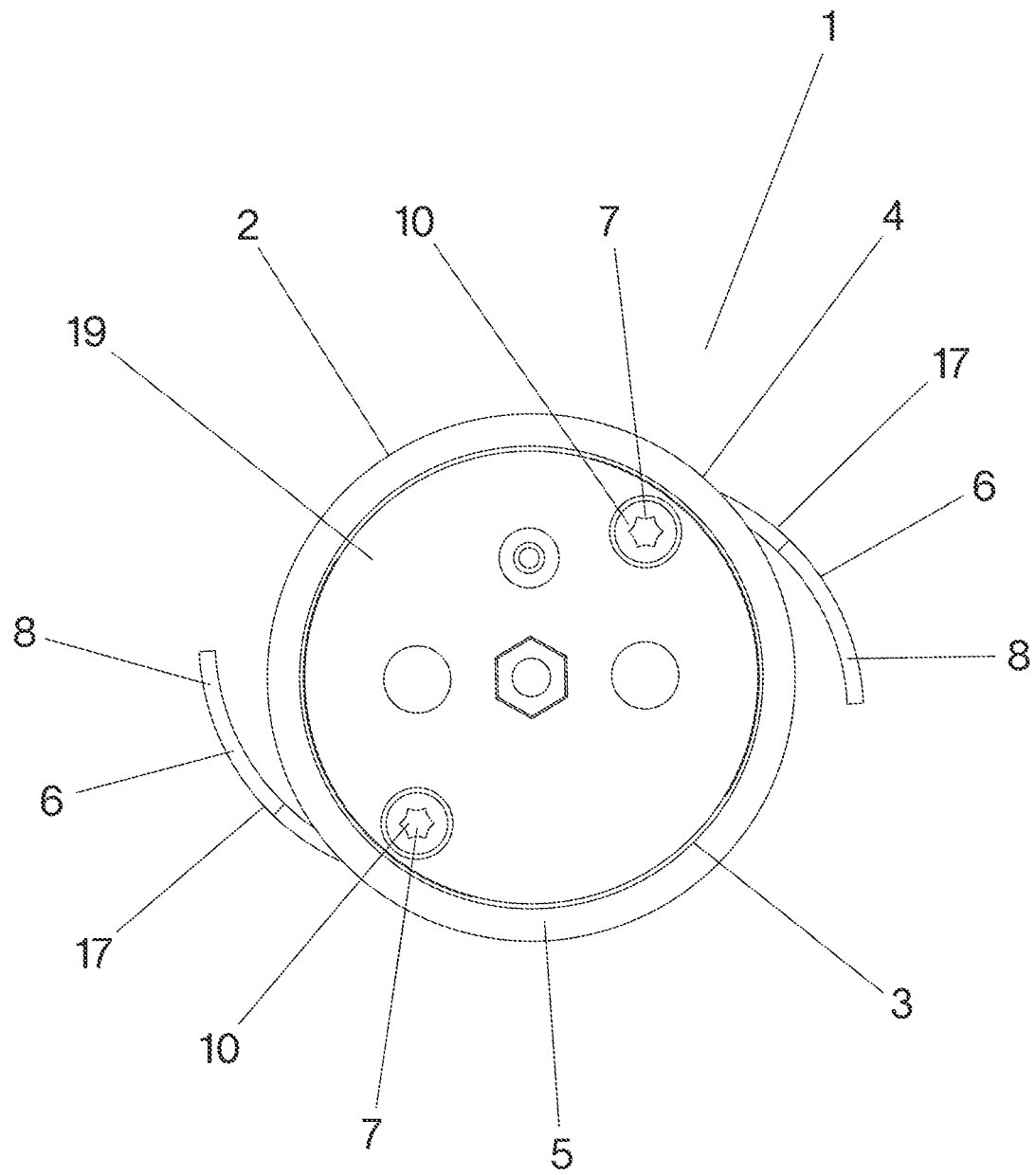
FIG. 8 shows a front view of a flush-mounted box with an electrical base element according to an alternative embodiment of the present invention.

FIG. 8 shows a front view of a flush-mounted box with an electrical base element according to an alternative embodiment of the present invention.

The flush-mounted box (1) and the electrical base element (19) in FIG. 8 are identical to the flush-mounted box (1) and the electrical base element (19) in FIGS. 5, 6 and 7. Once again the screw heads (10) and the central recess for the nut are clearly visible. There is a distance of 27 mm between the clamp screws (7).

Figure 9:
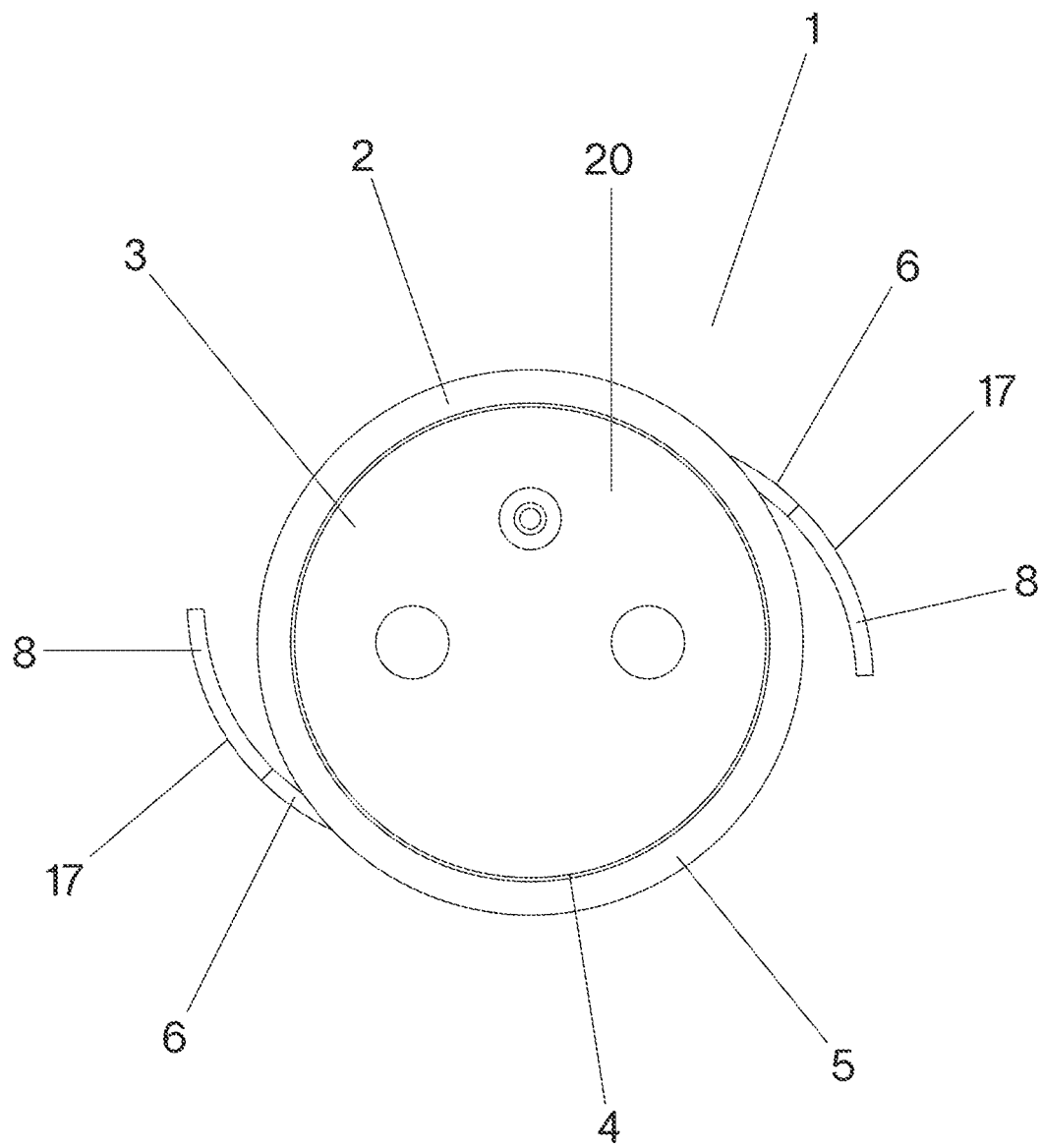
FIG. 9 shows a front view of a flush-mounted box with an electrical base element and a central part according to an alternative embodiment of the present invention.

FIG. 9 shows a front view of a flush-mounted box with an electrical base element and a central part according to an alternative embodiment of the present invention.

The flush-mounted box (1) and the electrical base element (19) in FIG. 9 are identical to the flush-mounted box (1) and the electrical base element (19) in FIGS. 5, 6, 7 and 8. The central part (20) is identical to the central part (20) in FIG. 7. The screw heads (10) and therefore the clamp screws (7) are covered by the central part.

Figure 10:
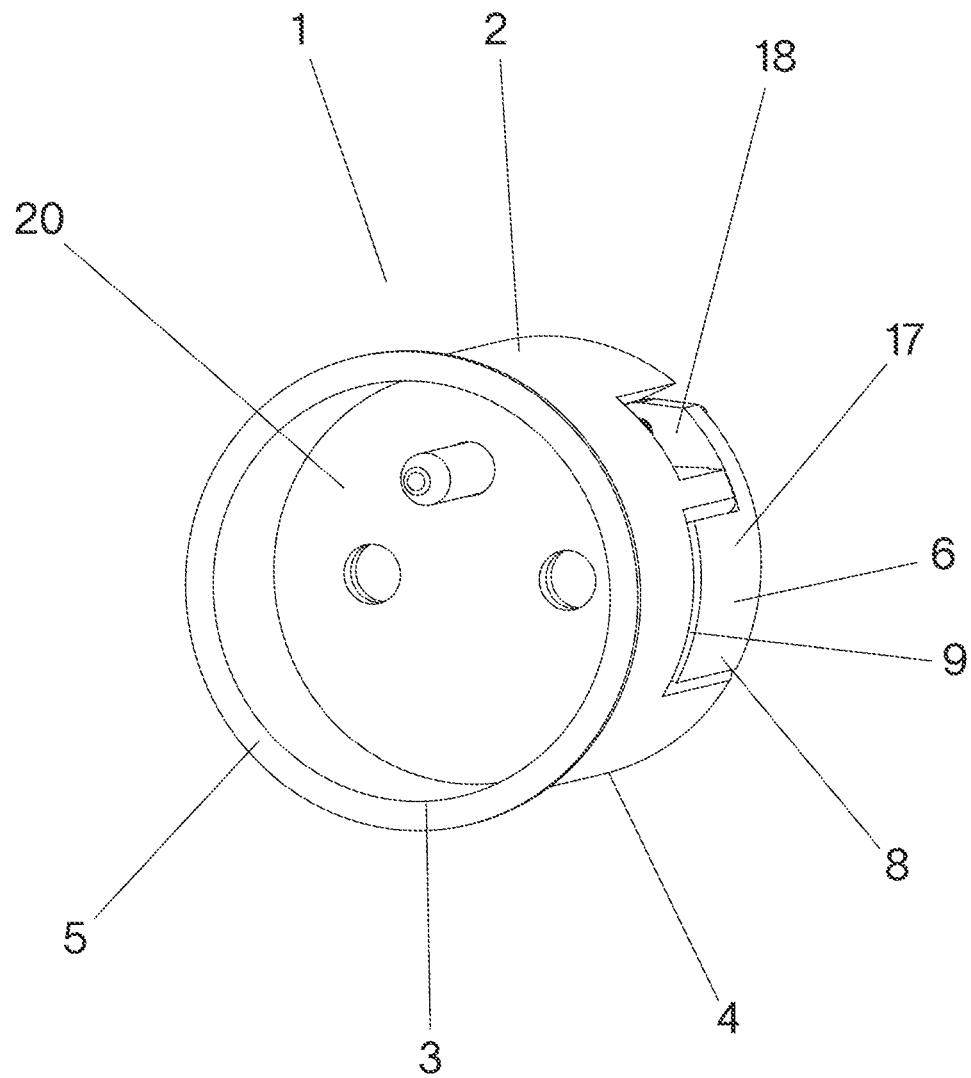
FIG. 10 shows a perspective view of a flush-mounted box with an electrical base element and a central part according to an alternative embodiment of the current invention, wherein clamps of the flush-mounted box are in a folded in position.

FIG. 10 shows a perspective view of a flush-mounted box with an electrical base element and a central part according to an alternative embodiment of the current invention, wherein clamps of the flush-mounted box are in a folded in position.

The flush-mounted box (1) and the electrical base element (19) in FIG. 9 are identical to the flush-mounted box (1) and the electrical base element (19) in FIGS. 5, 6, 7, 8 and 9. The central part (20) is identical to the central part (20) in FIGS. 7 and 9. FIG. 10 clearly shows how the curved surface (17) abuts the side wall (4) of the hollow body (2).

Figure 11:
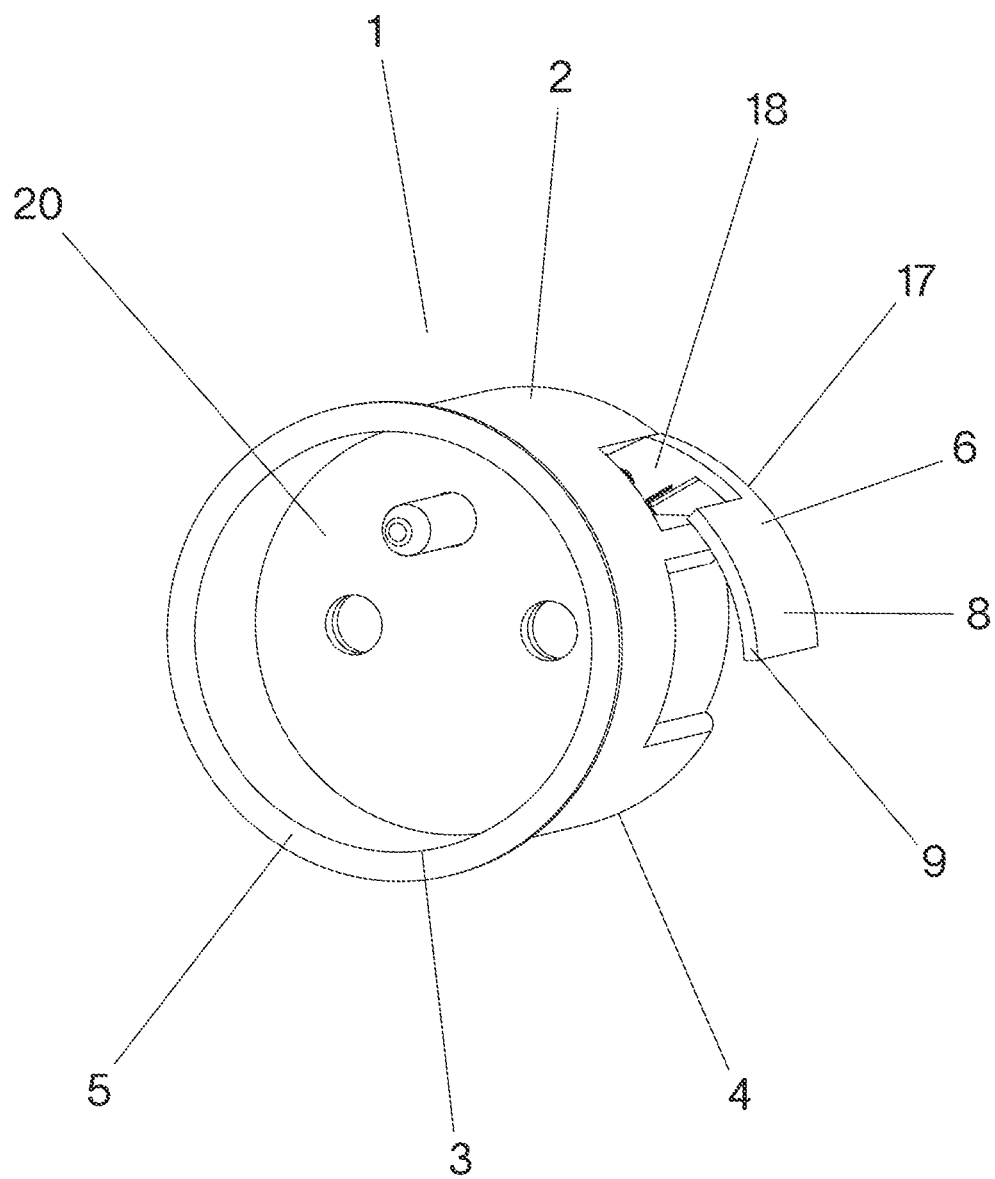
FIG. 11 shows a perspective view of a flush-mounted box with an electrical base element and a central part according to an alternative embodiment of the current invention, wherein clamps of the flush-mounted box are in a folded out position.

FIG. 11 shows a perspective view of a flush-mounted box with an electrical base element and a central part according to an alternative embodiment of the current invention, wherein clamps of the flush-mounted box are in a folded out position.

The flush-mounted box (1) and the electrical base element (19) in FIG. 10 are identical to the flush-mounted box (1) and the electrical base element (19) in FIGS. 5, 6, 7, 8, 9 and 10. The central part (20) is identical to the central part (20) in FIGS. 7, 9 and 10. In FIG. 11, the clamps (8) have been moved from the folded in position to the folded out position by tightening the clamp screws (7).

Figure 12:
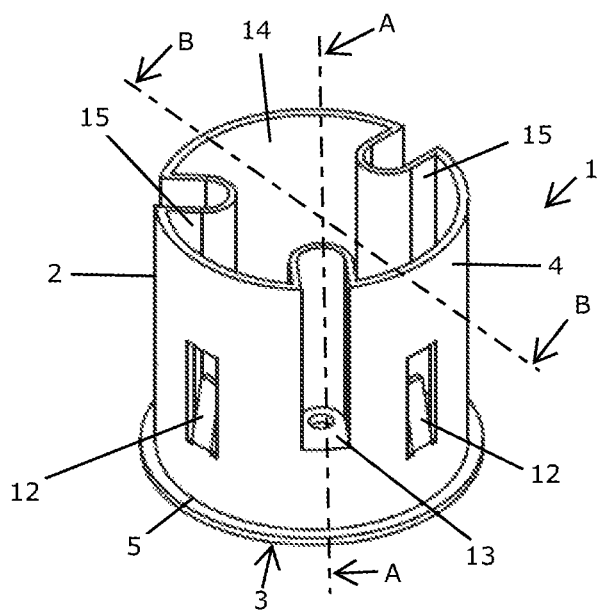
FIG. 12 shows a perspective view of a flush-mounted box according to yet another alternative embodiment of the present invention.

FIG. 12 shows a perspective view of a flush-mounted box according to yet another alternative embodiment of the present invention.

The flush-mounted box (1) comprises a hollow body (2). The hollow body (2) in this embodiment is a cylindrical body with an inner diameter of 36 mm. The hollow body (2) has an open base surface (3), a side wall (4) and an open top surface (14). The flush-mounted box (1) comprises a flange (2) around the open base surface (3). The flange (5) and an outline of the open base surface (3) are concentric. This is more clearly visible in FIG. 17. The flange (5) has an outer diameter in this embodiment of 42 mm. The flange (5) extends in a direction parallel to the open base surface (3) and away from the hollow body (2). The flush-mounted box (1) comprises three clamps (6) for clamping the flush-mounted box (1) in a hollow wall. The flush-mounted box (1) comprises a clamp screw (7) through each of the three clamps (6). The three clamps (6) can be moved to a plane formed by the open base surface (3) by tightening the clamp screws (7). The clamp screws (7) extend beyond the open top surface (14). The three clamps (6) and the clamp screws (7) are not shown in FIG. 12 but are visible in later figures. The flush-mounted box (1) comprises guides (15) that extend from the open top surface (14) and transversely to the open top surface (14) to the open base surface (3). Screw heads (10) of the clamp screws (7) rest against a support surface. This is more clearly visible in FIG. 13. The support surfaces form cams (13) for supporting an electrical base element (19). Only a single cam (13) is visible in FIG. 12. The cams (13) extend transversely to the side wall (4) in the hollow body (2). This is more clearly visible in FIG. 13. The flush-mounted box (1) comprises a click system (12) in the side wall (4) for clicking into place an electrical base element (19). The click system (12) comprises flexible arms that are prestressed inwards towards the hollow body (2). In this specific embodiment, the click system (12) comprises three flexible arms. This is clearer in FIG. 17. The flush-mounted box (1) has a depth D (D). The depth D (D) is measured in a direction transverse to the open base surface (3) from the open base surface (3) to a furthest point of the flush-mounted box (1) according to the mentioned direction. The depth D (D) in this specific embodiment is 37 mm. The flush-mounted box (1) can be placed in a cylindrical space. Because the hollow body (2) is a cylindrical body with an inner diameter of 36 mm and a wall thickness of 0.8 mm, the flush-mounted box (1) can be placed in a cylindrical space with an inner diameter of at least 37.6 mm. Even if the cylindrical space has an inner diameter of 39.5 mm, the flush-mounted box (1) can still be placed in the cylindrical space. In that case, the flange (5) with an outer diameter of 42 mm has sufficient overlap with a hollow wall to prevent the flush-mounted box (1) from being pressed through the hollow wall. In this embodiment the clamp screws (7) are placed on a circular outline with a diameter of 26.4 mm.

Figure 13:
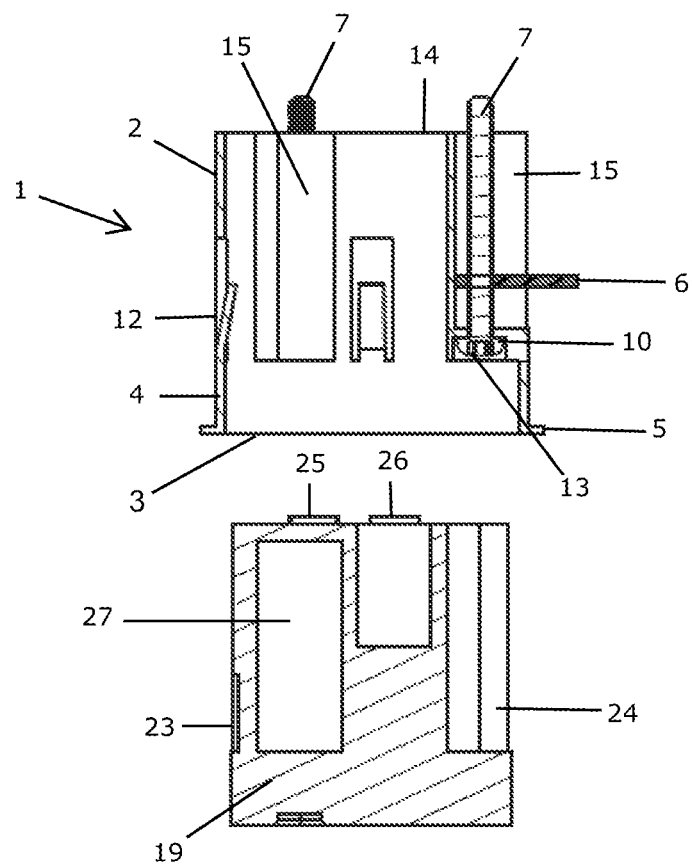
FIG. 13 shows a cross-sectional view of the flush-mounted box and an electrical base element that has not yet been installed, according to line A-A in FIG. 12.

FIG. 13 shows a cross-sectional view of the flush-mounted box and an electrical base element that has not yet been installed, according to line A-A in FIG. 12.

FIG. 13 shows the flexible arms of the click system (12) that are prestressed inwards towards the hollow body (2). It is also visible how the clamp screws (7) extend beyond and transverse to the open top surface (14). The electrical base element (19) in this embodiment is a type B socket according to standard IEC 60083:2015. In this embodiment, the electrical base element (19) has an outer diameter of 34.4 mm, which means it can be placed in the flush-mounted box (1). The electrical base element (19) has notches (23) for receiving the flexible arms of the click system (12), through which the electrical base element (19) can be clicked into the flush-mounted box (1). Also clearly visible is the recess (24) for receiving the guides (15) of the flush-mounted box (1). The recesses (24) do not extend completely, so that the support surfaces, which form part of the guides (15), form cams (13) against which the electrical base element (19) rests after placement in the flush-mounted box (1). Furthermore, a connection point (25) for the first contact point (30) and a connection point (26) for a grounding contact (32) are also visible in FIG. 13. There is also a space (27) in the electrical base element (19) for the first contact point (30).

Figure 14:
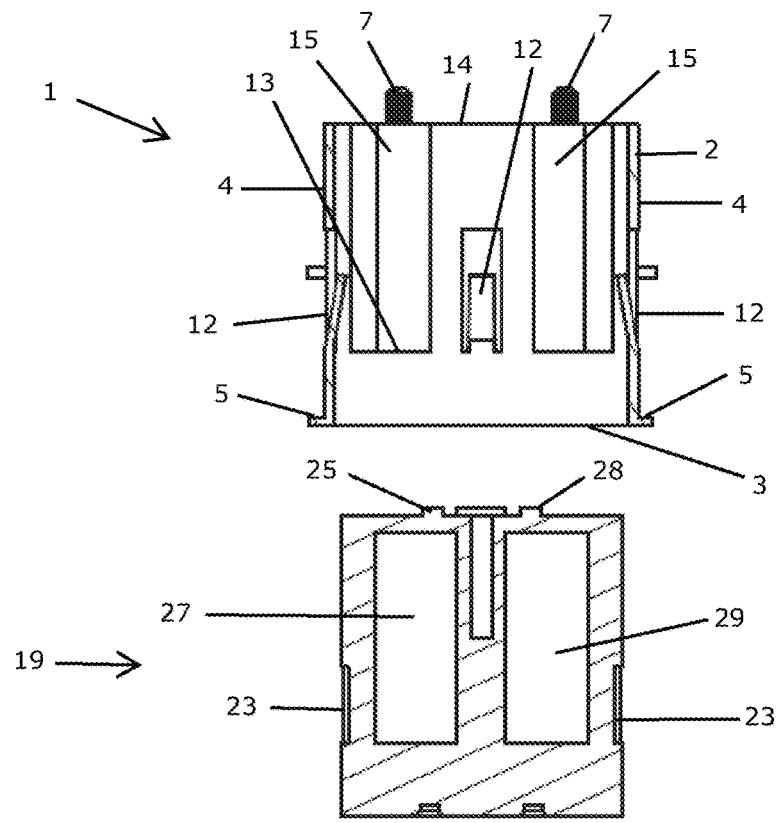
FIG. 14 shows a cross-sectional view of the flush-mounted box and an electrical base element that has not yet been installed, according to line B-B in FIG. 12.

FIG. 14 shows a cross-sectional view of the flush-mounted box and an electrical base element that has not yet been installed, according to line B-B in FIG. 12.

The flush-mounted box (1) and the electrical base element (19) are the same as in FIG. 13. FIG. 14 shows the three flexible arms of the click system (12) of the flush-mounted box (1). In addition to the connection point (25) for the first contact point (30), a connection point (28) for a second contact point (31) and a space (29) for the second contact point (31) of the type B socket are also shown. The electrical base element (19) has still not been placed in the flush-mounted box (1).

Figure 15:
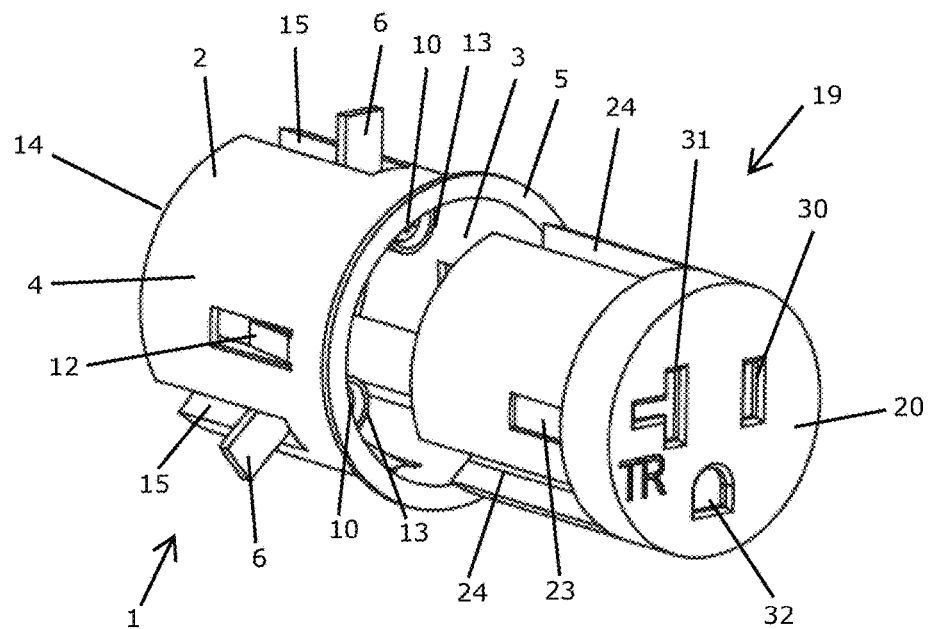
FIG. 15 shows a perspective view of the flush-mounted box according to FIG. 12 with an electrical base element that has not yet been installed.

FIG. 15 shows a perspective view of the flush-mounted box according to FIG. 12 with an electrical base element that has not yet been installed.

The flush-mounted box (1) and the electrical base element (19) are the same as in FIG. 13 and FIG. 14. It is clearly visible how the electrical base element (19) is oriented in such a way that the guides (15) will be accommodated in the recesses (24). A central part (20) is placed on the electrical base element (19). The central part (20) comprises an opening for the first contact point (30), an opening for the second contact point (31) and an opening for the grounding contact (32). The central part (20) forms the functional part of the type B socket. In this embodiment the socket is a socket suitable for currents up to 20 A.

Figure 16:
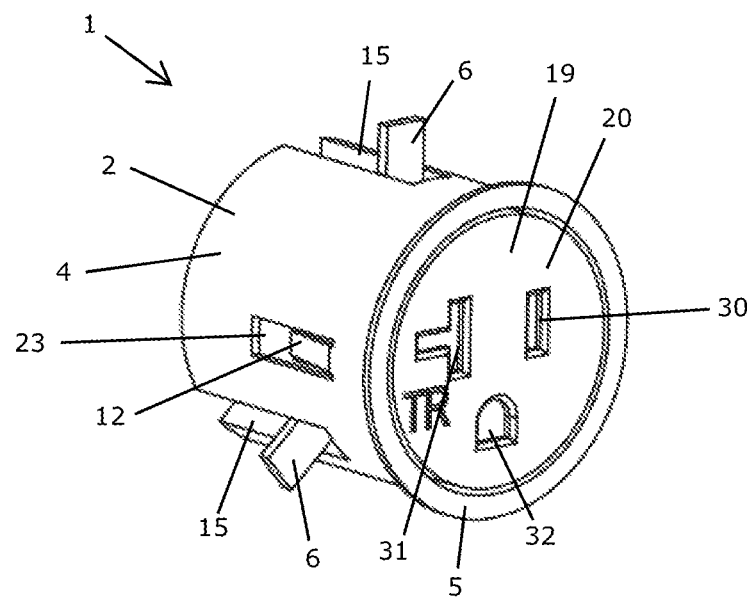
FIG. 16 shows a perspective view of the flush-mounted box according to FIG. 12 after installation of the electrical base element according to FIG. 12.

FIG. 16 shows a perspective view of the flush-mounted box according to FIG. 12 after installation of the electrical base element according to FIG. 12.

After placing the electrical base element (19) in the flush-mounted box (1), the central part (20) of the socket shields the clamp screws (10). There is a gap of 0.8 mm between the wall (4) of the flush-mounted box (1) and an outer diameter of the central part (20). Because the flange (5) is a finished part of the flush-mounted box (1), the use of a cover frame is not even necessary.

Figure 17:
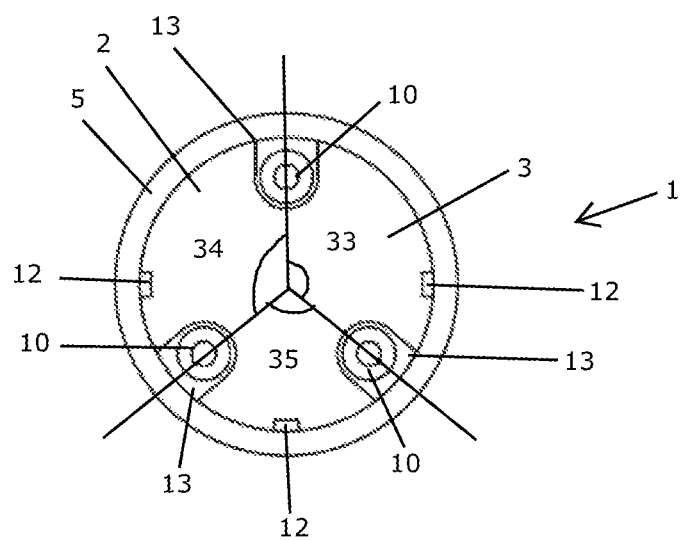
FIG. 17 shows a front view of the flush-mounted box according to FIG. 12.

FIG. 17 shows a front view of the flush-mounted box according to FIG. 12.

FIG. 17 shows how there is an angle (34) of 130° between a first clamp screw (10) and a second clamp screw (10). There is an angle (33) of also 130° between the first clamp screw (10) and a third clamp screw (10). An angle (35) between the second clamp screw (10) and the third clamp screw (10) is then 100°. A vertex of the angles (33, 34, 35) coincides with a center of the circular outline on which the clamp screws (10) are placed. This distribution of the clamp screws is particularly advantageous because as a result the clamp screws (10) do not come into contact with the contact points (30, 31) and the grounding contact (35) and can be shielded by the central part (20) of the socket.

Figure 18:
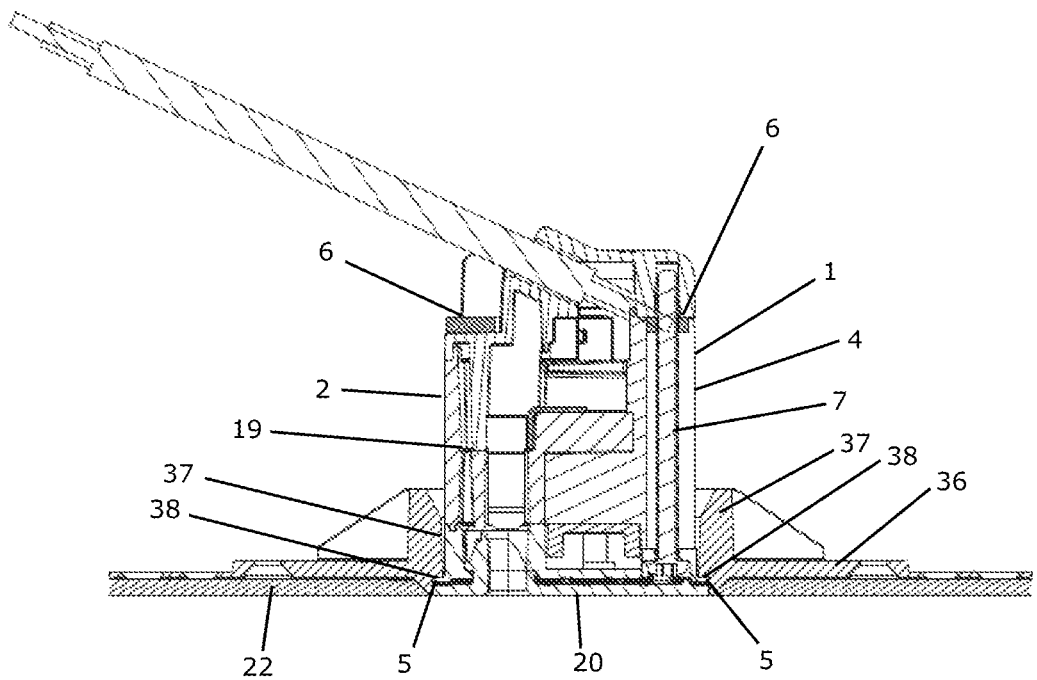
FIG. 18 shows a cross-section of a flush-mounted box according to an embodiment of the current invention, wherein the flush-mounted box is placed in a hollow wall using a mounting plate.

FIG. 18 shows a cross-section of a flush-mounted box according to an embodiment of the current invention, wherein the flush-mounted box is placed in a hollow wall using a mounting plate.

The flush-mounted box (1) is placed in a round opening in a hollow wall (22). In this embodiment, a mounting plate (36) is placed on a front side of the hollow wall (22). The mounting plate (36) comprises a cylindrical wall (37) extending on the mounting plate (36). The cylindrical wall (37) has an open base surface and an open top surface. The mounting plate (36) is plastered on a front side of the mounting plate (36) up to the open base surface of the cylindrical wall (37). FIG. 18 shows only a layer of plaster on the front side of the mounting plate (36) of the hollow wall (22). It will be apparent that a rear side of the mounting plate (36) is placed on, for example, board material of the hollow wall (22). The board material is not shown in FIG. 18. The cylindrical wall (37) bounds a cylindrical space. The cylindrical space extends through the round opening in the hollow wall (22) to the rear of the hollow wall (22). The flush-mounted box (1) is placed into the cylindrical space through the round opening in the hollow wall (22). After screwing down the clamps (6), the clamps (6) clamp against the cylindrical wall (37). In FIG. 18 the clamps (6) are not yet screwed down. The mounting plate (36) comprises a recess (38). The flange (5) of the flush-mounted box (1) is accommodated in the recess (38).

Figure 19:
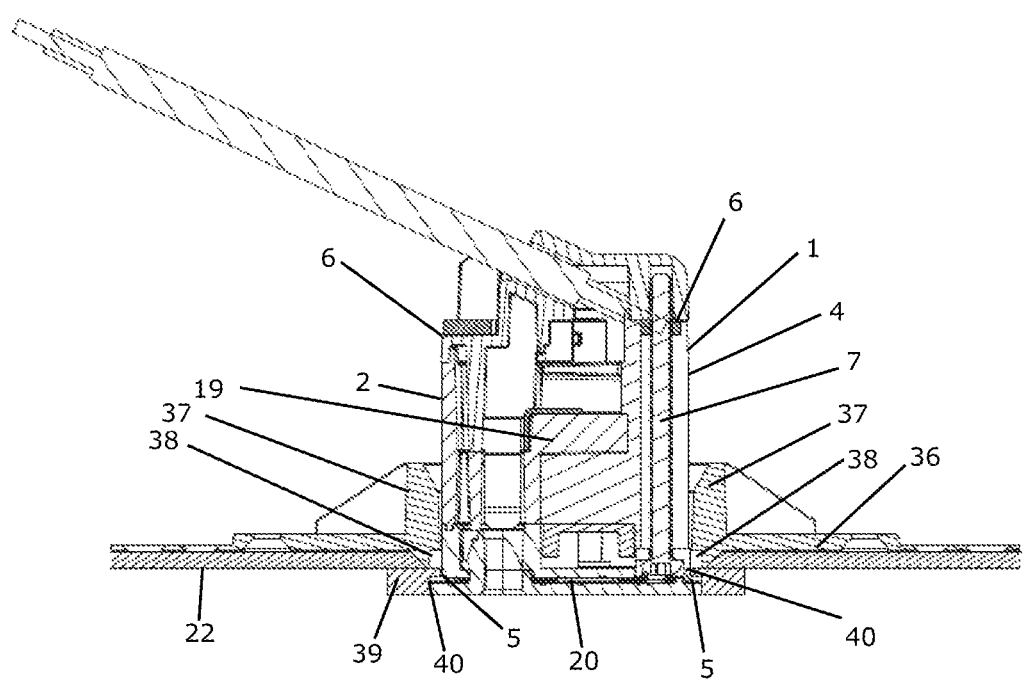
FIG. 19 shows a cross-section of a flush-mounted box according to an alternative embodiment of the current invention, wherein the flush-mounted box is placed in a hollow wall using a mounting plate and wherein a removable ring is clamped between the hollow wall and a flange of the flush-mounted box.

FIG. 19 shows a cross-section of a flush-mounted box according to an alternative embodiment of the current invention, wherein the flush-mounted box is placed in a hollow wall using a mounting plate and wherein a removable ring is clamped between the hollow wall and a flange of the flush-mounted box.

This embodiment is very similar to the embodiment in FIG. 18. The big difference is that in this embodiment a removable ring (39) is clamped between the hollow wall (22) and the flange (5) of the flush-mounted box (1). The removable ring (39) has a recess (40) on an inner outline. The flange (5) is accommodated in the recess (40). The removable ring (39) covers an edge of the opening in the hollow wall (22).

THE NUMBERED ELEMENTS IN THE FIGURES ARE

1. Flush-mounted box
2. Hollow body
3. Open base surface
4. Side wall
5. Flange
6. Clamp 7. Clamp screw
8. Protrusion
9. Free end
10. Screw head
11. Recess
12. Click system
13. Cam
14. Open top surface
15. Guides
16. Bridge
17. Curved surface
18. Hinged arm
19. Electrical base element
20. Central part
21. Closed top surface
22. Hollow wall
23. Notch
24. Guide recess
25. Connection point for first contact point
26. Grounding contact connection point
27. Space for first contact point
28. Connection point for second contact point
29. Space for second contact point
30. First contact point
31. Second contact point
32. Grounding contact
33. Angle between first clamp screw and third clamp screw
34. Angle between first clamp screw and second clamp screw
35. Angle between second clamp screw and third clamp screw
36. Mounting plate
37. Cylindrical wall
38. Recess in mounting plate
39. Removable ring
40. Recess in the removable ring

The invention claimed is:

1. Flush-mounted box for installation of an electrical base element in a hollow wall, comprising a hollow body with an open base surface and a side wall, a flange around the open base surface, at least one clamp for clamping the flush-mounted box in the hollow wall and a clamp screw through the at least one clamp, wherein the flange extends in a direction parallel to the open base surface and away from the hollow body, wherein the hollow body can be placed in a cylindrical space up to the flange, wherein the at least one clamp can be moved by tightening the clamp screw along the side wall to a plane formed by the open base surface, characterized in that the cylindrical space in which the hollow body can be placed has an inner diameter of 37 mm±4 mm, wherein the clamp screw of the at least one clamp is placed on a circular outline with a diameter of no more than 28.5 mm and wherein the circular outline and the cylindrical space are concentric.

2. The flush-mounted box according to claim 1, characterized in that the flange has an outer diameter of a maximum of 49 mm.

3. The flush-mounted box according to claim 1, characterized in that the flush-mounted box comprises a click system in the side wall of the hollow body for clicking an electrical base element into place.

4. The flush-mounted box according to claim 1, characterized in that the flush-mounted box comprises cams for supporting an electrical base element, the cams extending transversely to the side wall in the hollow body of the flush-mounted box.

5. The flush-mounted box according to claim 1, characterized in that the flush-mounted box comprises at least two clamps, wherein in a plane parallel to the open base surface there is an angle of at least 110° and at most 160° between a first clamp screw and a second clamp screw, where a vertex of said angle coincides with a center of the circular outline on which the clamp screws are placed.

6. The flush-mounted box according to claim 5, characterized in that the flush-mounted box contains three clamps, wherein in a plane parallel to the open base surface between a first clamp screw and a second clamp screw there is an angle of at least 110° and at most 160° and between the first clamp screw and a third clamp screw there is an angle of at least 110° and at most 160°, where a vertex of said angles coincides with a center of the circular outline on which the clamp screws are placed.

7. The flush-mounted box according to claim 5, characterized in that the flush-mounted box comprises two clamps, wherein, viewed in a plane parallel to the plane formed by the flange, a first of the two clamps extends from the clamp screw of the first clamp over a greater distance than a second of the two clamps extends from the clamp screw of the second clamp.

8. The flush-mounted box according to claim 1, characterized in that a screw head of the at least one clamp screw rests against a support surface, wherein the support surface forms a cam for supporting an electrical base element, wherein the cam extends transversely to the side wall in the hollow body of the flush-mounted box.

9. Assembly of a flush-mounted box and an electrical base element, characterized in that the flush-mounted box is a flush-mounted box according to claim 1, wherein the electrical base element is placed in the hollow body.

10. The assembly according to claim 9, characterized in that a central part is placed on the electrical base element, wherein the central part shields the at least one clamp screw.

11. The assembly according to claim 9, characterized in that the electrical base element has an outer diameter that is at most 2 mm smaller than an inner diameter of the open base surface.

12. The assembly according to claim 9, characterized in that the electrical base element is a type B socket, wherein the flush-mounted box comprises at least two clamps, wherein the clamp screws of the at least two clamps are located on a circular outline, wherein a first clamp screw is located between a first and a second contact point of the socket and wherein a second clamp screw is located between the first contact point and a grounding contact.

13. The assembly according to claim 12, characterized in that the electrical base element comprises three clamps, wherein a third clamp screw is located between the first contact point and the grounding contact.

14. Method for installing an electrical base element in a hollow wall, comprising:
providing a flush-mounted box comprising a hollow body with an open base surface and a side wall, a flange around the open base surface, at least one clamp for clamping the flush-mounted box in the hollow wall and a clamp screw through the at least one clamp, wherein the flange extends in a direction parallel to the open base surface and away from the body, wherein the hollow body is a cylinder or a truncated cone, wherein the hollow body can be placed in a cylindrical space up to the flange;
making an opening for the flush-mounted box in the hollow wall;

placing the flush-mounted box in the opening in the hollow wall, wherein the hollow body is positioned through the opening in the hollow wall and wherein the flange rests against the hollow wall;

tightening the clamp screw, wherein the at least one clamp moves along the side wall to the open base surface and clamps against a rear side of the hollow wall;

connecting an electrical base element to cabling in the hollow wall;

placing the electrical base element in the flush-mounted box;

characterized in that a flush-mounted box according to claim 1 is used.

15. The method according to claim 14, characterized in that the electrical base element is clicked into the side wall of the hollow body in the flush-mounted box with the aid of a click system.

16. The method according to claim 14, characterized in that the at least one clamp screw is covered by placing the electrical base element in the flush-mounted box.

17. The method according to claim 14, characterized in that before placing the flush-mounted box in the hollow wall, a junction box is placed behind the hollow wall, wherein the flush-mounted box is placed into the junction box through the opening in the hollow wall and wherein the electrical base element in the junction box is connected to the cabling.

18. The method according to claim 14, characterized in that the electrical base element is a type B socket.

19. The method according to claim 14, characterized in that a screw head of the at least one clamp screw rests against a support surface, wherein the support surface forms a cam for supporting an electrical base element, wherein the cam extends transversely to the side wall in the hollow body of the flush-mounted box, wherein when placing the electrical base element in the flush-mounted box, a surface of the electrical base element is placed against the cam.

* * * * *